(12) United States Patent
Liu et al.

(10) Patent No.: US 10,942,924 B2
(45) Date of Patent: Mar. 9, 2021

(54) LOB QUERY PERFORMANCE VIA AUTOMATIC INFERENCE OF LOCATOR-LESS LOB BY VALUE SEMANTICS

(71) Applicant: Oracle International Corporation, Redwood Shores, CA (US)

(72) Inventors: Zhen Hua Liu, San Mateo, CA (US); Geeta Arora, Union City, CA (US); Hui Joe Chang, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 15/807,336

(22) Filed: Nov. 8, 2017

(65) Prior Publication Data
US 2019/0102450 A1   Apr. 4, 2019

Related U.S. Application Data

(60) Provisional application No. 62/566,262, filed on Sep. 29, 2017.

(51) Int. Cl.
*G06F 16/00* (2019.01)
*G06F 16/2455* (2019.01)
*G06F 16/28* (2019.01)
*G06F 16/22* (2019.01)
*G06F 16/242* (2019.01)

(52) U.S. Cl.
CPC ...... *G06F 16/2455* (2019.01); *G06F 16/2246* (2019.01); *G06F 16/2423* (2019.01); *G06F 16/24553* (2019.01); *G06F 16/284* (2019.01); *G06F 16/289* (2019.01)

(58) Field of Classification Search
CPC .................................................. G06F 16/2455
USPC ......................................................... 707/713
See application file for complete search history.

(56) References Cited

U.S. PATENT DOCUMENTS

| 6,341,281 B1 * | 1/2002 | MacNicol | G06F 16/24539 |
| 2004/0167879 A1 * | 8/2004 | Cotner | G06F 16/2219 |
| 2004/0220923 A1 * | 11/2004 | Nica | G06F 16/24544 |

(Continued)

OTHER PUBLICATIONS

Leyderman, R. et al., "SecureFiles and Large Objects Developer's Guide 11g Release 2 (11.2)", Oracle Database, (Jul. 2013).

(Continued)

*Primary Examiner* — Thu Nguyet T Le
(74) *Attorney, Agent, or Firm* — Vista IP Law Group, LLP

(57) ABSTRACT

An approach for improving LOB query performance via automatic inference of locator-less LOB by value semantics in a relational database system is provided. A relational database management system (RDBMS) is implemented to perform operations on LOBs based on the semantics of a statement. During statement compilation, the RDBMS identifies inline LOB column(s) that are not required to be returned to a client. During execution, the identified column(s) are accessed via a shared buffer cache and fed to an operator for evaluation. For inline LOB column(s) that must be returned to the client, during execution, the inline LOB data is copied from the shared buffer cache to a temporary buffer area. Data in the temporary buffer area is fed to an operator for evaluation and is used to create a LOB locator for the inline LOB column(s) that must be returned to the client.

42 Claims, 26 Drawing Sheets

(56) References Cited

U.S. PATENT DOCUMENTS

2006/0047670 A1* 3/2006 Yu .................. G06F 16/2219
2008/0147627 A1* 6/2008 Natkovich .......... G06F 16/2454
2013/0117332 A1* 5/2013 Wei .................. G06F 16/2219
                                                              707/803
2017/0371939 A1* 12/2017 Chintakayala .......... H04L 63/06

OTHER PUBLICATIONS

Jegraj, V. et al., "LOB Performance Guidelines", Oracle White Paper, (May 2004).
Hows, D. et al. "The Definitive Guide to MongoDB: A Complete Guide to Dealing with Big Data Using MongoDB", Second Edition, Apress, (Nov. 4, 2013).
Bruni, P. et al., "LOBs with DB2 for z/OS: Stronger and Faster", IBM Corp, (Nov. 2006).
AWS, "AWS Database Migration Service: User Guide", Amazon Web Services, Inc., (Jan. 1, 2016).
Sybase, "Large Objects Management: Sybase IQ 15.1", Sybase, Inc., (Dec. 2009).
Pons, A. et al., "Handling Unstructured Data Type in DB2 and Oracle", Communications of the IIMA: vol. 3: Issue 2, Article 6, (2003).

* cited by examiner

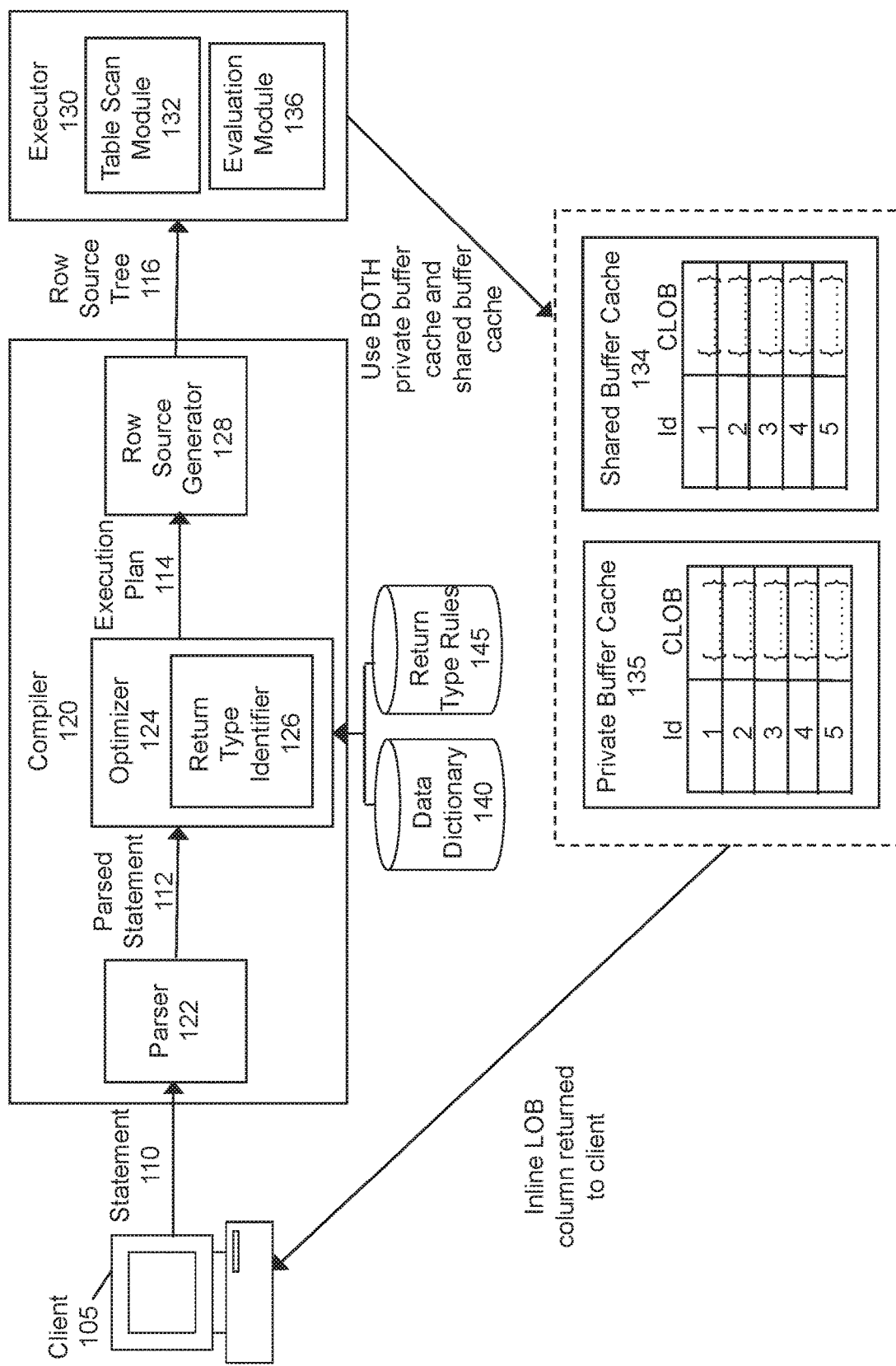

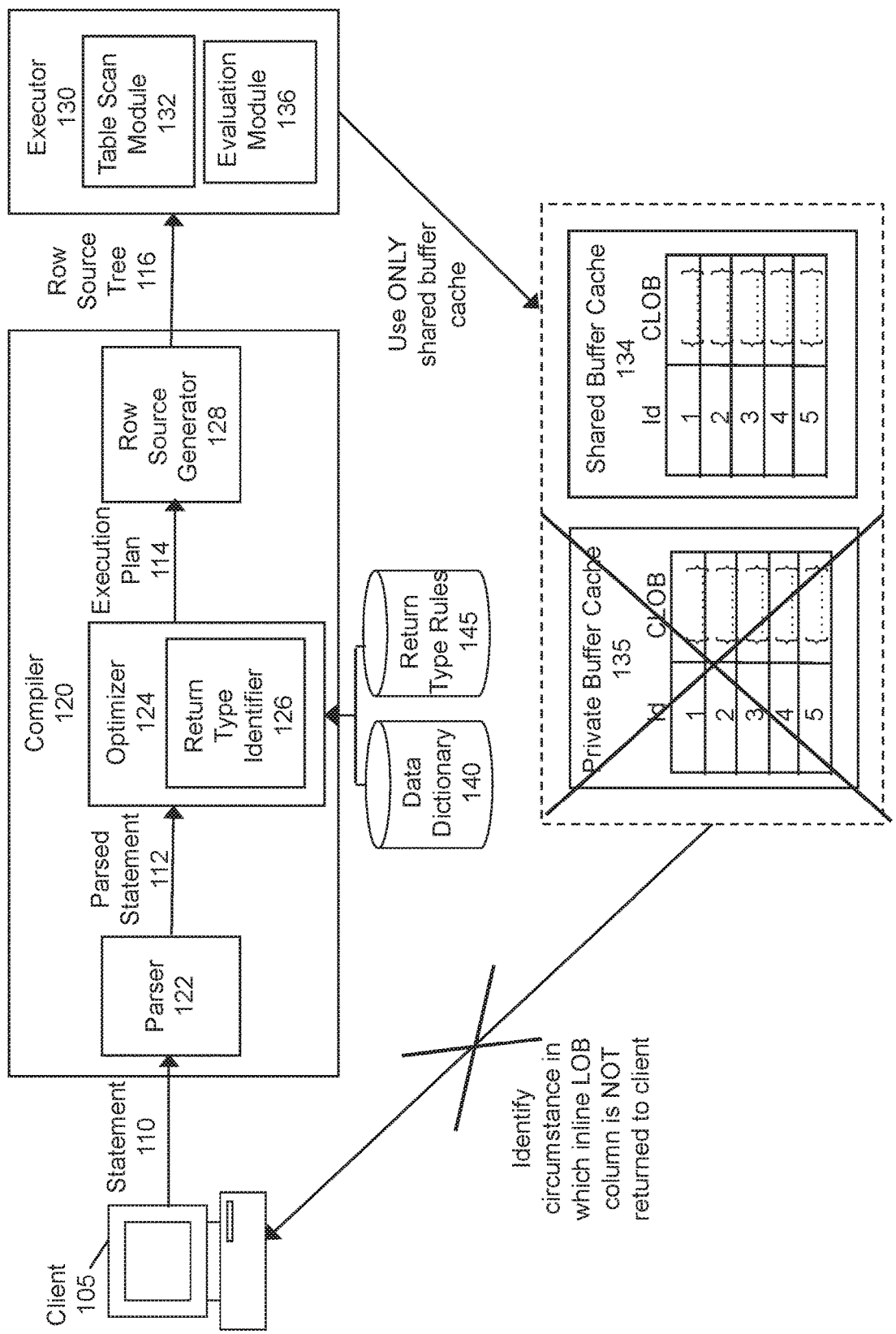

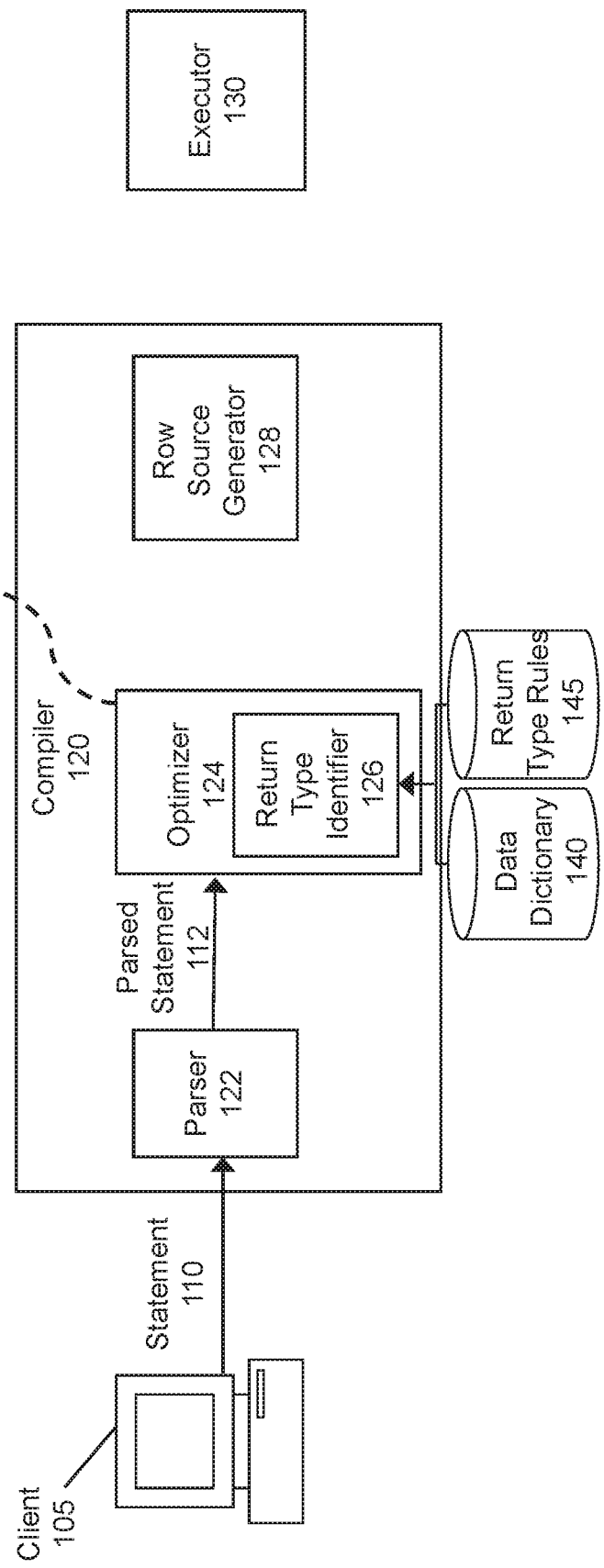

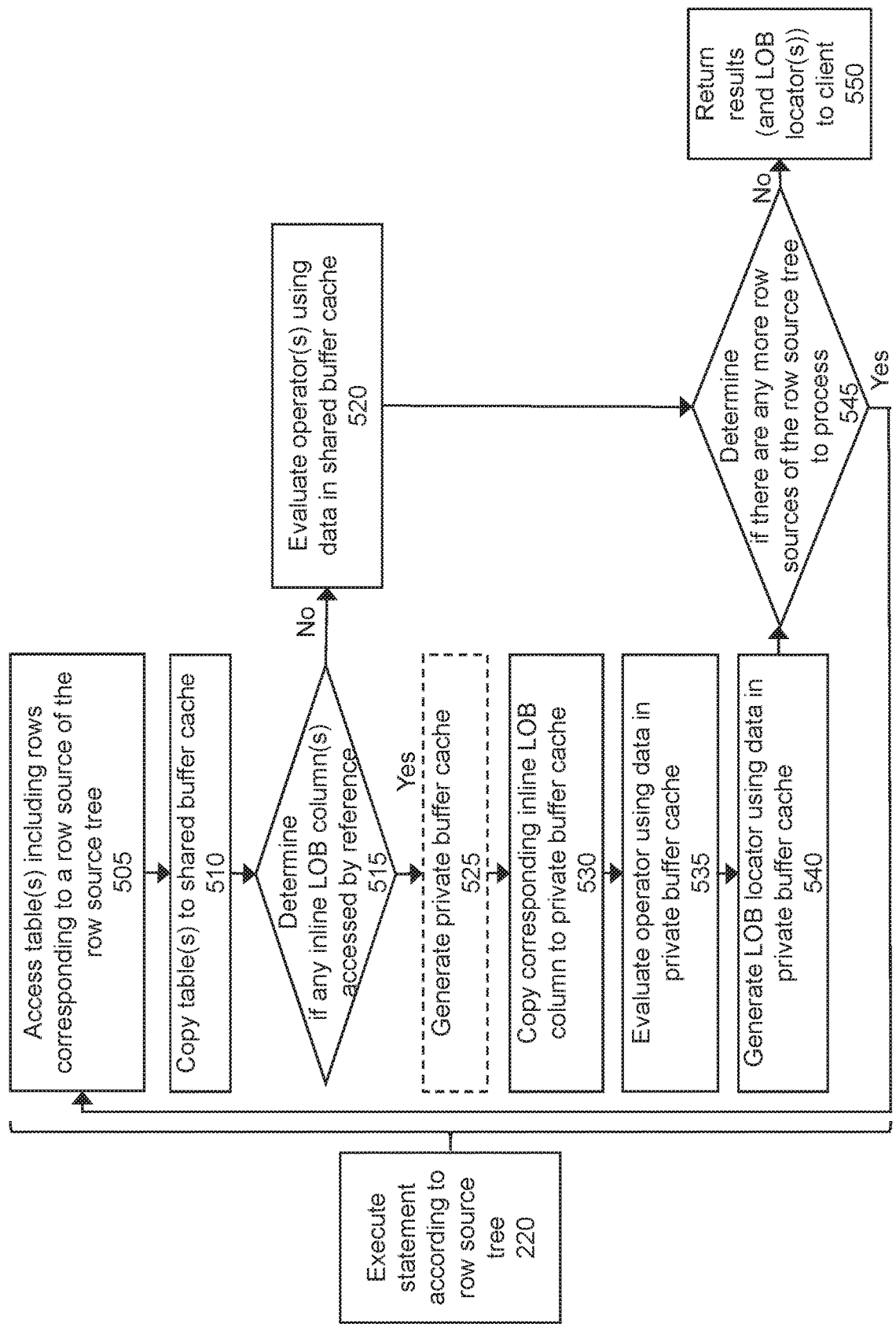

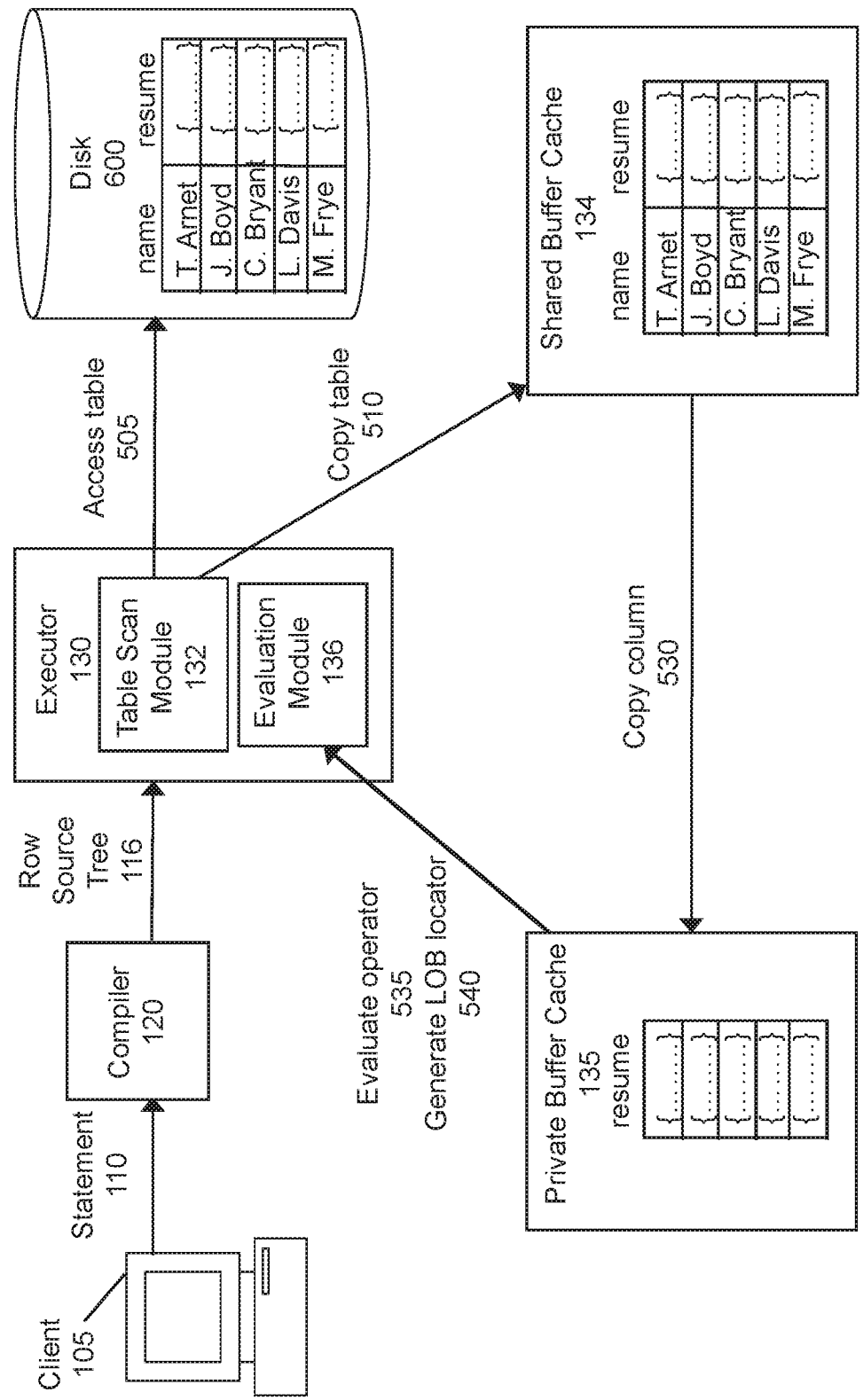

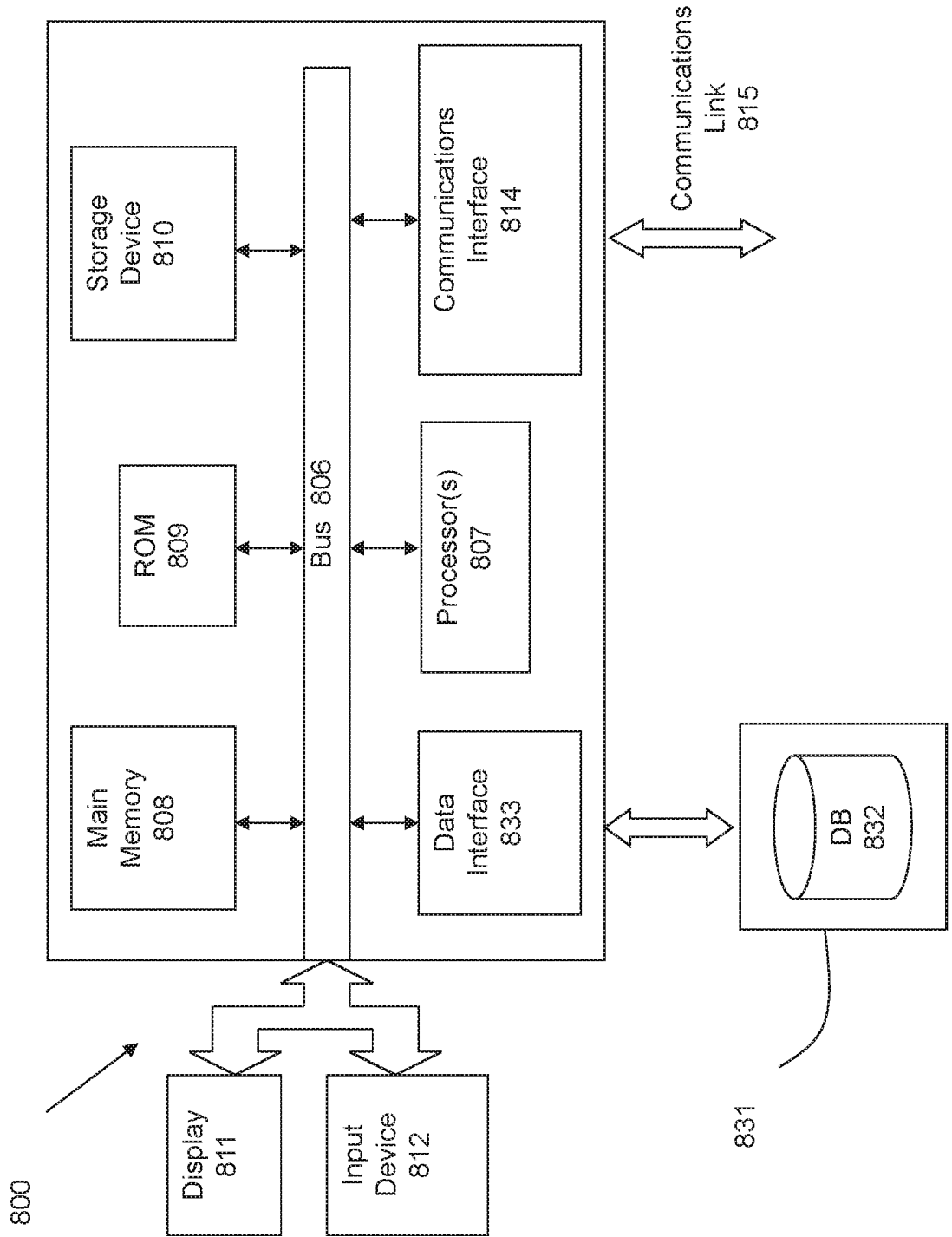

LOB QUERY PERFORMANCE VIA AUTOMATIC INFERENCE OF LOCATOR-LESS LOB BY VALUE SEMANTICS

RELATED APPLICATION

This application claims the benefit of U.S. Provisional Application No. 62/566,262 titled "IMPROVING LOB QUERY PERFORMANCE VIA AUTOMATIC INFERENCE OF LOCATOR-LESS LOB BY VALUE SEMANTICS," filed Sep. 29, 2017, which is incorporated herein by reference in its entirety.

FIELD

This disclosure concerns a method, a computer program product, and a computer system for improving LOB query performance via automatic inference of locator-less LOB by value semantics in a relational database system.

BACKGROUND

A relational database management system (RDBMS) controls the storage, organization, and retrieval of data stored in relational databases located at one or more database servers. The database server(s) may be interconnected by a network, which may also connect one or more clients (e.g., workstations, personal computers, or remote computing terminals). Clients may submit statements (e.g., SQL statements and queries) via the network to perform various tasks in a relational database (e.g., create tables, insert data into tables, retrieve data from tables, etc.).

Due to the increasing number of content-rich applications, as well as the growth of the Internet, an increasingly common datatype used to store large amounts of semi-structured and unstructured data in relational databases is the Large Object (LOB) datatype. One type of LOB is the Binary Large Object (BLOB) datatype, which is used to store large amounts of binary data, such as images, audio and video files, and other multimedia objects. Another type of LOB is the Character Large Object (CLOB) datatype, which is used to store large amounts of character data, such as deeds, documents (e.g., JSON and XML documents), books, etc.

Users may choose to store data as a LOB rather than as a different datatype for various reasons. One such reason may be that LOBs are not subject to the stricter size limits that apply to other datatypes such as the VARCHAR and RAW datatypes. For example, although maximum size limits of 4 KB and 2 KB may be imposed on data stored in VARCHAR and RAW columns, respectively, LOB columns may store data that is much larger in size (e.g., several GBs). Another reason that users may prefer to store their data as a LOB datatype rather than as a different datatype is that the LOB datatype supports random piece-wise access to data while other datatypes may not (e.g., only sequential access is supported for data that is stored as a LONG datatype). Thus, even when the size of data to be stored does not exceed the maximum size limit for non-LOB datatype columns, users may prefer to store their data as a LOB datatype rather than as a non-LOB datatype.

LOBs may be stored differently depending on their size and/or based on storage properties set for tables in which the LOBs are stored. Smaller LOBs (e.g., those that are 4 KB or smaller) may be stored inline, such that the actual LOB value is stored in a table row while larger LOBs (e.g., those that are larger than 4 KB) may be stored out-of-line, such that the actual LOB value is stored outside of a table row. Furthermore, inline storage of LOBs may be enabled or disabled for a table (e.g., based on storage properties set for the LOB column upon creation of the table).

Conventionally, RDBMSs allow LOB data to be accessed or manipulated in a random piece-wise manner through the use of LOB locators. LOB locators use reference-based semantics to access LOBs and can be thought of as pointers to the actual locations of LOB values. To access or manipulate LOB data, a LOB locator received from a client (e.g., in a SQL statement) can be passed to a LOB API, which may perform various operations on the LOB data. By using a LOB locator, operations may be performed on a LOB at any given offset (e.g., data may be read from the LOB at a specific offset or written to the LOB at a specific offset).

In order for a client to obtain a LOB locator, an RDBMS must first create the LOB locator, which requires a substantial amount of overhead. For example, to create a LOB locator, LOB data must first be copied from disk to a shared buffer cache that is shared by all database server and background processes for a database instance. Then a rowid (i.e., information required to locate a row at which the LOB data is stored), query snapshot information, and a full copy of the LOB data must be copied to a temporary staging buffer area (e.g., a private buffer cache associated with a database session serving a client from whom a query was received). The extra copy of the LOB data in the temporary staging buffer area is required by the RDBMS to create and maintain a locator for the LOB. During this process, computing resources must be allocated (e.g., to create the temporary staging buffer area, to copy the LOB data to the temporary staging buffer area, etc.).

In contrast, the execution of a statement that does not require a LOB locator to be created and returned (i.e., a statement that accesses/manipulates non-LOB datatypes) requires much less overhead. For example, when executing a statement involving a VARCHAR column, the VARCHAR data is copied from disk to the shared buffer cache and a pointer to this data in the shared buffer cache allows the data to be accessed and fed to an operator included in the statement. In this example, the operator may then be evaluated to execute the statement. Since this process does not require an extra copy of the data to be created and maintained, the execution of a statement that does not require a LOB locator to be created and returned is less time-consuming than the execution of a statement that requires a LOB locator to be created and returned.

Therefore, users who submit LOB queries or other statements that access or manipulate LOB data will experience performance degradation in comparison to users who submit queries or statements that do not access or manipulate LOB data since a LOB locator will need to be created and returned to the users in the former case, but not in the latter case. This is true even for LOB data that is stored inline, similar to non-LOB datatypes, since LOB locators are required by default to access/manipulate LOB data. Due to the increasing amounts of semi-structured and unstructured data being stored in relational databases as LOB datatypes, LOB query performance will likely continue to degrade for the foreseeable future.

Thus, there is a need for an approach to improve LOB query performance.

SUMMARY

Embodiments of the present invention provide a method, a computer program product, and a computer system for improving LOB query performance via automatic inference of locator-less LOB by value semantics in a relational database system.

According to some embodiments, an RDBMS is implemented to perform operations on LOBs based on the semantics of a statement, such as an SQL statement, received from a client. The statement received by the RDBMS from the client may be a query directed to a table stored in a relational database. When compiling the statement, the RDBMS determines whether any inline LOB columns (i.e., columns containing LOB data that is stored inline) must be returned to the client. To make this determination, a query block comprising the statement is parsed into a query tree that includes multiple branches, in which each branch corresponds to a clause of the statement. For each branch, the RDBMS determines whether an inline LOB column referenced in the corresponding clause is required to be returned to the client based on the semantics of the clause. If an inline LOB column is not required to be returned to the client, it is marked as having a value-based return type in an execution plan that describes how the statement will be executed. In contrast, if an inline a LOB column is required to be returned to the client, the LOB column may be marked as having a reference-based return type in the execution plan. Upon completion of compilation of the statement, a row source tree having multiple nodes is created, in which each node of the tree corresponds to a row source (i.e., a set of table rows returned by executing a step of the execution plan). The row source tree may include a flag indicating that access to an inline LOB column was marked as having a reference-based return type or a value-based return type in the execution plan.

During execution of the statement, depending on whether an inline LOB column referenced in the statement was marked as having a value-based return type or a reference-based return type in the execution plan, a LOB locator may be created for the column. To execute the statement, a table including an inline LOB column may be copied from disk into memory at a shared buffer cache that is shared by all database server and background processes for a database instance. If the column was marked as having a value-based return type, access to the inline LOB data may be set up such that a pointer directly points to the inline LOB data in the shared buffer cache. The inline LOB data may be fed directly to an operator included in the statement and the operation may then be evaluated. Conversely, if the column is marked as having a reference-based return type, a rowid identifying a row at which the LOB data is located and a full copy of the LOB data may be copied from the shared buffer cache to a temporary staging buffer area. In some embodiments, query snapshot information is also copied from the shared buffer cache to the temporary staging buffer area if the LOB column is marked as having a reference-based return type. Using the data copied to this temporary staging buffer area, a LOB locator for the LOB column is created and returned to the client. Furthermore, the inline LOB data may be fed from the temporary staging buffer area to an operator included in the statement and the operation may then be evaluated. Once execution of the statement is complete, a set of results and/or a set of LOB locators may be returned to the client.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 1A illustrates components of a relational database management system used to compile and execute a statement received from a client if an inline LOB column is required to be returned to the client according to some embodiments of the invention.

FIG. 1B illustrates components of a relational database management system used to compile and execute a statement received from a client if an inline LOB column is not required to be returned to the client according to some embodiments of the invention.

FIGS. 3A-3G illustrate an example of compiling a statement having LOB by value semantics according to some embodiments of the invention.

FIG. 5 is a flow chart for executing a statement according to a row source tree according to some embodiments of the invention.

FIGS. 7A-7D illustrate an example of executing a statement having LOB by reference semantics according to some embodiments of the invention.

FIG. 8 is a block diagram of a computing system suitable for implementing an embodiment of the present invention.

DETAILED DESCRIPTION OF THE EMBODIMENTS OF THE INVENTION

Figure 2A:
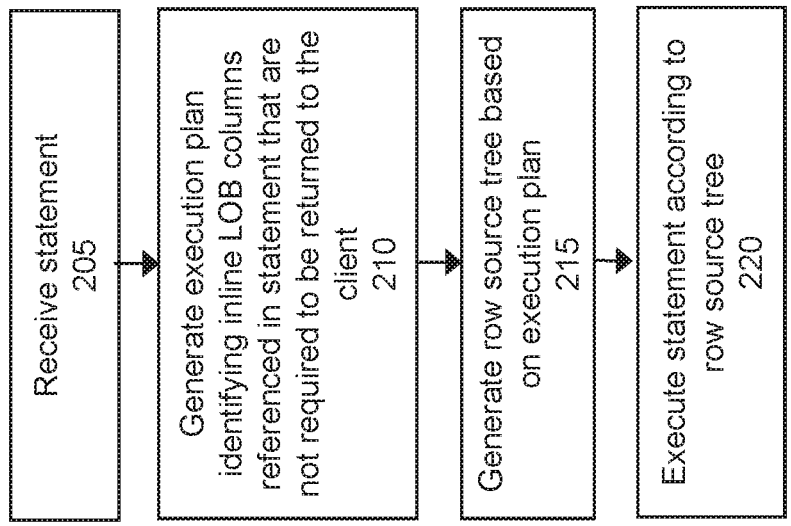
FIG. 2A is a flowchart for executing a statement by identifying inline LOB columns that are not required to be returned to a client according to some embodiments of the invention.

The present disclosure provides an approach for improving LOB query performance via automatic inference of locator-less LOB by value semantics in a relational database system.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

This disclosure will now discuss an approach for improving LOB query performance via automatic inference of locator-less LOB by value semantics in a relational database system. When compiling a statement received from a client that is directed to a table stored in a relational database, an RDBMS identifies inline LOB columns that are not required to be returned to the client. During execution, these columns are accessed via a shared buffer cache and evaluated. For inline LOB columns that must be returned to the client, during execution, the inline LOB data is copied from the shared buffer cache to a temporary buffer area. Data in the temporary buffer area is evaluated and used to create a LOB locator for the inline LOB columns that must be returned to the client.

For illustrative purposes, FIGS. 1A and 1B show a client 105 that communicates a statement 110 to a compiler 120 of the RDBMS. However, in various embodiments, the client 105, as well as additional clients 105, may communicate additional statements 110 to the compiler 120 that are not depicted in FIGS. 1A and 1B. Furthermore, conventional components of RDBMSs and clients 105, such as API layers, and the like are not shown so as to not obscure the components of the RDBMS to be discussed with regard to FIGS. 1A and 1B.

To demonstrate the approach for improving LOB query performance via automatic inference of locator-less LOB by value semantics in a relational database system, FIG. 1A illustrates components of a relational database management system used to compile and execute a statement received from a client if an inline LOB column is required to be returned to the client according to some embodiments of the invention. As shown in this figure, the RDBMS includes a compiler 120 that receives a statement 110 (e.g., an SQL statement) from a client 105. In some embodiments, the statement 110 received from the client 105 is a request (e.g., a query) to access or manipulate data stored in one or more relational databases at one or more database servers. Upon receiving the statement 110 from the client 105, the compiler 120 may generate a row source tree 116 that is used to execute the statement 110. In some embodiments, components of the compiler 120 include a parser 122, an optimizer 124, and a row source generator 128. The components of the compiler 120 perform various steps in a compilation process to generate the row source tree 116 based on the statement 110 received from the client 105.

The parser 122 may perform various checks on the statement 110 originating from the client 105. In some embodiments, the parser 122 may check the statement 110 for syntactic validity. For example, if the compiler 120 receives the statement 110 "SELECT * FORM employees;" from the client 105, the parser 122 identifies an error when checking the statement 110 for syntactic validity since the keyword "FROM" is misspelled as "FORM." The compilation process may stop upon identifying the misspelling and an error indicating this misspelling may be returned to the client 105. The parser 122 may also perform a semantic check. For example, if the compiler 120 receives the statement 110 "SELECT * FROM employee_table," from the client 105, in which a table named "employee_table" does not exist, the parser 122 may determine that the table does not exist, stop the compilation process, and return an error indicating that the table does not exist to the client 105. The parser 122 may also check whether a version of an execution plan 114 (described below) for the statement 110 already exists so that steps of processing that are resource-intensive (e.g., steps performed by the optimizer 124 and the row source generator 128) may be skipped. For example, when the compiler 120 receives a statement 110 from the client 105, the parser 122 may search for an existing execution plan 114 that corresponds to the statement 110 (e.g., in a shared buffer cache 134 that is shared by all database server and background processes for one database instance). If a corresponding execution plan 114 exists, the compiler 120 may reuse the execution plan 114; otherwise, the compiler 120 must generate a new execution plan 114. Once the parser 122 has completed performing checks on the statement 110, the parser 122 may pass the parsed statement 112 to the optimizer 124. In some embodiments, the parser 122 may also store the parsed statement 112 (e.g., in the shared buffer cache 134).

The parsed statement 112 that is received at the optimizer 124 may include one or more query blocks. Each query block in the parsed statement 112 may be identified by a keyword (e.g., SELECT, INSERT, UPDATE, DELETE, or MERGE), which signals the beginning of a query block. For example, suppose the following statement 110 is received from the client 105: "SELECT name FROM dept IN (SELECT dept FROM hr.dept WHERE location_id=1600);" The statement 110 in this example includes two query blocks that each begin with the "SELECT" keyword—an inner query block (in parentheses) and an outer query block (the remainder of the statement 110).

The optimizer 124 may generate an execution plan 114 based on the parsed statement 112 received from the parser 122. The execution plan 114 is a combination of steps for executing the statement 110, which may include information describing a method by which each table mentioned in the statement 110 is to be accessed, a method by which tables referenced in the statement 110 are to be joined, etc. In embodiments in which the statement 110 received from the client 105 includes multiple query blocks, the execution plan 114 generated by the optimizer 124 may include a sub-execution plan for each query block.

In some embodiments, to generate the execution plan 114, the optimizer 124 may first generate multiple candidate plans and select the most efficient candidate plan to be the execution plan 114. In such embodiments, each candidate plan may involve different access methods (e.g., full table scans or index scans), different join orders or methods, and different query transformations. The optimizer 124 may compute an estimated cost of each candidate plan (e.g., in terms of I/O, CPU, etc.), compare the estimated cost of each candidate plan, and select the candidate plan with the lowest estimated cost to be the execution plan 114. The optimizer 124 may access a data dictionary 140, which provides information about each database controlled by the RDBMS (e.g., definitions of all schema objects, such as tables, functions, etc.) to generate and to compute an estimated cost of each candidate plan.

To illustrate how the optimizer 124 generates the execution plan 114, suppose that the statement 110 received from the client 105 is a query requesting information from a table of employee information about employees who are managers. The optimizer 124 may generate two candidate plans for executing the statement 110, in which the first candidate plan involves performing a full table scan and the second candidate plan involves reading an index and then accessing the table by rowid based on information stored in the data dictionary 140. The optimizer 124 may compute an estimated cost for each candidate plan based on information stored in the data dictionary 140 that indicates a percentage of the employees listed in the table who are managers. If the information stored in the data dictionary 140 indicates that 90% of the employees listed in the table are managers, it would likely be more efficient to execute the statement 110 by performing a full table scan rather than by reading an index and then accessing the table by rowid. Therefore, the optimizer 124 will likely determine that the estimated cost of the first candidate plan is lower than the estimated cost of the second candidate plan. If the estimated cost of the first candidate plan is indeed lower than the estimated cost of the second candidate plan, the optimizer 124 will select the first candidate plan to be the execution plan 114.

When generating the execution plan 114, the optimizer 124 may identify inline LOB columns that are not required to be returned to the client 105 when the statement 110 is executed. For example, if the following statement 110 is received from the client 105 "SELECT count(*) FROM t WHERE json_exists(jcol, '$.person.creditscore?(@>=500)');" the optimizer 124 may identify jcol to be an inline LOB column based on information stored in the data dictionary 140 indicating storage properties for the column. The optimizer 124 may then determine that jcol is not required to be returned to the client 105 based on the semantics of the statement 110. Here, since jcol is only used in the WHERE clause for predicate evaluation, it is not returned to the client 105 upon execution of the statement 110. The optimizer 124 may make this determination using a return type identifier 126 and by accessing one or more return type rules 145, which are described below in conjunction with FIGS. 2B, 3A-3G, and 4A-4D. The inline LOB columns that are not required to be returned to the client 105 may be marked as having a value-based return type in the execution plan 114 (e.g., access to the LOB columns is marked as "LOB by value"). In embodiments in which the optimizer 124 generates multiple candidate plans, the inline LOB columns that are not required to be returned to the client 105 may be marked as having a value-based return type in the candidate plans.

When generating the execution plan 114, the optimizer 124 may also identify inline LOB columns that are required to be returned to the client 105 when the statement 110 is executed. For example, if the following statement 110 is received from the client 105: "SELECT jcol FROM t;" the optimizer 124 may identify jcol to be an inline LOB column based on information stored in the data dictionary 140 indicating storage properties for the column. The optimizer 124 may then determine that since jcol is used in the select list of the SELECT clause (i.e., the list of columns in the result set of the SELECT statement), it is returned to the client 105 upon execution of the statement 110. As described above, the optimizer 124 may make this determination using a return type identifier 126 and by accessing one or more return type rules 145. The inline LOB columns that are required to be returned to the client 105 may be marked as having a reference-based return type in the execution plan 114 (e.g., access to the LOB columns is marked as "LOB by reference"). In embodiments in which the optimizer 124 generates multiple candidate plans, the inline LOB columns that are required to be returned to the client 105 may be marked as having a reference-based return type in the candidate plans.

The execution plan 114 generated by the optimizer 124 may be passed to the row source generator 128 of the compiler 120, which generates a row source tree 116. The row source tree 116 may have multiple nodes, in which each node of the tree corresponds to a row source (i.e., a set of table rows returned by executing a step of the execution plan 114). Examples of row sources include a table, a database view, or a set of rows generated by performing a join or a grouping operation. Each set of table rows that is returned is either used by another step of the execution plan 114 or is returned to the client 105. In embodiments in which the execution plan 114 indicates that an inline LOB column is or is not required to be returned to the client 105, the row source tree 116 generated by the row source generator 128 may indicate this as well. For example, the row source tree 116 may include a flag indicating that access to a LOB column was marked as "LOB by value" or "LOB by reference" in the execution plan 114. Once generated, the row source tree 116 may be passed from the compiler 120 to the executor 130. In some embodiments, the execution plan 114 and/or the row source tree 116 also may be stored (e.g., in the shared buffer cache 134).

Upon receiving the row source tree 116 from the compiler 120, the executor 130 may execute the statement 110. In some embodiments, components of the executor 130 include a table scan module 132 and an evaluation module 136. The components of the executor 130 perform various steps in an execution process to execute the statement 110 by executing each row source of the row source tree 116 received from the compiler 120.

When processing a row source of the row source tree 116, the table scan module 132 may attempt to access one or more inline LOB columns referenced by the statement 110. A table including each inline LOB column may be copied from disk to memory in a shared buffer cache 134. As shown in FIG. 1A, if the table scan module 132 determines that an inline LOB column that is being accessed is required to be returned to the client 105 (e.g., based on a flag indicating that access to the column was marked as "LOB by reference"), the table scan module 132 may create a temporary staging buffer area (e.g., a private buffer cache 135) that is specific to the client's session. Then the rowid and a full copy of the inline LOB content may be copied from the shared buffer cache 134 to the private buffer cache 135. In some embodiments, the table scan module 132 may also copy query snapshot information to the private buffer cache 135, allowing the LOB content corresponding to a specific time to be accessed. The LOB content may then be fed to an operator (e.g., an SQL operator or predicate), which may be evaluated by the evaluation module 136. The information that was copied to the private buffer cache 135 is used to create a LOB locator for the inline LOB column so that the column may be returned to the client 105. This information is preserved in the private buffer cache 135 in order to allow read-consistent access to the LOB instance. When execution of the statement 110 is complete, the LOB locator may be returned to the client 105 in conjunction with a set of results.

In contrast to FIG. 1A, FIG. 1B illustrates components of a relational database management system used to compile and execute a statement received from a client if an inline LOB column is not required to be returned to the client according to some embodiments of the invention. As shown in FIG. 1B, if the table scan module 132 determines that an inline LOB column that is being accessed does not need to be returned to the client 105 (e.g., based on a flag indicating that access to the LOB column was marked as "LOB by value"), the private buffer cache 135 is not required. Instead, the table scan module 132 may set up access to the inline LOB column with a pointer that points to the inline LOB content in the shared buffer cache 134. The inline LOB content may then be fed to an operator, which may be evaluated by the evaluation module 136. When execution of the statement 110 is complete, a set of results may be returned to the client 105.

FIG. 2A is a flowchart for executing a statement by identifying LOB columns that are not required to be returned to a client according to some embodiments of the invention. Some of the steps illustrated in the flowchart are optional in different embodiments. In some embodiments, the steps may be performed in an order different from that described in FIG. 2A.

The flowchart begins when the compiler 120 of the RDBMS receives (step 205) a statement 110 (e.g., an SQL statement or query). The statement may be received (step 205) directly from the client 105 or indirectly from the client 105 (e.g., via an intermediate database server, such as a local database server). The statement 110 may be directed to one or more tables stored in one or more relational databases. For example, suppose the compiler 120 receives (step 205) the following statement 110 from the client 105: "SELECT count(*) FROM table WHERE json_exists(jcol, '$.person.creditscore?(@>=500)');" in which "jcol" is a column containing LOB data in a table named "table" and the operator "json exists" checks to see whether a person with a credit score of at least 500 exists in the table.

Upon receiving (step 205) the statement 110, the parser 122 at the compiler 120 may perform various checks on the statement 110, as described above in conjunction with FIG. 1A. In the above example, the parser 122 may perform a syntactic check on the statement 110 (e.g., by checking for misspelled keywords) as well as a semantic check (e.g., by making sure that the table named "table" exists and that a column named "jcol" exists within "table"). The parser 122 may also check the shared buffer cache 134 to determine whether a version of execution plan 114 that corresponds to the statement 110 already exists so that steps performed by the optimizer 124 and the row source generator 128 may be skipped. Once the parser 122 has completed performing the checks on the statement 110, the parsed statement 112 may be passed to the optimizer 124.

Based on the parsed statement 112 received from the parser 122, the optimizer 124 may generate (step 210) an execution plan 114 that identifies inline LOB columns referenced in the statement 110 that are not required to be returned to the client 105, which is further described below in conjunction with FIGS. 2B, 3A-3G, and 4A-4D. As described above, the execution plan 114 is a combination of steps for executing the statement 110, which may include information describing a method by which each table referenced in the statement 110 is to be accessed, a method by which tables to be joined in the statement 110 are to be joined, etc. In various embodiments, the execution plan 114 may indicate which inline LOB columns referenced in the statement 110 are not required to be returned to the client 105. In some embodiments, the execution plan 114 may also or alternatively indicate which inline LOB columns referenced in the statement 110 are required to be returned to the client 105. As described above in conjunction with FIG. 1A, in some embodiments, the optimizer 124 may generate multiple candidate plans, compute an estimated cost of each candidate plan, compare the estimated cost of each candidate plan, and select the candidate plan with the lowest estimated cost to be the execution plan 114. Once generated (step 210) by the optimizer 124, the execution plan 114 may be passed to the row source generator 128 of the compiler 120.

The row source generator 128 generates (step 215) a row source tree 116 based on the execution plan 114. As described above, the row source tree 116 is a collection of row sources, in which each row source is a set of table rows returned by executing a step of the execution plan 114. A row source may be a table, a database view, or a set of rows generated by performing a join or a grouping operation. Furthermore, a row source is either used by another step of the execution plan 114 or is returned to the client 105. In embodiments in which the execution plan 114 indicates that an inline LOB column is or is not required to be returned to the client 105, the row source tree 116 generated by the row source generator 128 may indicate this as well (e.g., the row source tree 116 may include a flag indicating that access to an inline LOB column was marked as "LOB by value" or as "LOB by reference" in the execution plan 114). Once generated (step 215), the row source tree 116 may be passed from the compiler 120 to the executor 130.

The executor 130 may then execute (step 220) the statement 110 according to the row source tree 116. The executor 130 may execute (step 220) the statement 110 by executing each row source of the row source tree 116 received from the compiler 120. During execution (step 220) of the statement 110, the table scan module 132 may access an inline LOB column from a table and copy the LOB data from disk to memory in the shared buffer cache 134. In embodiments in which the column was previously identified as an inline LOB column that is not required to be returned to the client 105, the table scan module 132 may set up access to the inline LOB column with a pointer that directly points to the inline LOB content in the shared buffer cache 134. The inline LOB content may then be fed to the operator (e.g., the predicate "json exists"), which is evaluated by the evaluation module 136.

In some embodiments, the table scan module 132 may determine that an inline LOB column was previously identified as a column that is not required to be returned to the client 105 based on a flag indicating that the column was marked as having a value-based return type in the execution plan 114 (e.g., access to the LOB column was marked as "LOB by value"). In other embodiments, the table scan module 132 may determine that an inline LOB column was previously identified as a column that is not required to be returned to the client 105 by default absent a flag indicating that the column was marked as having a reference-based return type in the execution plan 114 (e.g., access to the LOB column was not marked as "LOB by reference").

In embodiments in which an inline LOB column being accessed by the table scan module 132 is required to be returned to the client 105, the table scan module 132 may perform additional steps to execute (step 220) the statement 110. In some embodiments, after copying the LOB data from disk to memory in the shared buffer cache 134, the table scan module 132 creates a temporary staging buffer area (e.g., a private buffer cache 135) that is specific to the client's session. Then the rowid and a full copy of the inline LOB content is copied from the shared buffer cache 134 to the private buffer cache 135. The table scan module 132 may also copy query snapshot information to the private buffer cache 135, allowing the LOB content corresponding to a specific time to be accessed. The LOB content may then be fed to an operator which may be evaluated by the evaluation module 136. During execution (step 220) of the statement 110, the information that was copied to the private buffer cache 135 is used to create a LOB locator so that the corresponding inline LOB column may be returned to the client 105. This information may be preserved in the private buffer cache 135 in order to allow read-consistent access to an instance of the inline LOB column.

In some embodiments, the table scan module 132 may determine that an inline LOB column being accessed by the table scan module 132 is required to be returned to the client 105 based on a flag indicating that the column was marked as having a reference-based return type in the execution plan 114 (e.g., access to the LOB column was marked as "LOB by reference"). In other embodiments, the table scan module 132 may determine that an inline LOB column being accessed by the table scan module 132 is required to be returned to the client 105 by default absent a flag indicating that the column was marked as having a value-based return type in the execution plan 114 (e.g., access to the LOB column was not marked as "LOB by value").

A set of results may be returned to the client 105 once execution (step 220) of the statement 110 is complete. Depending on whether any inline LOB columns were required to be returned to the client 105, the set of results may be returned to the client 105 in conjunction with a set of LOB locators.

Figure 2B:
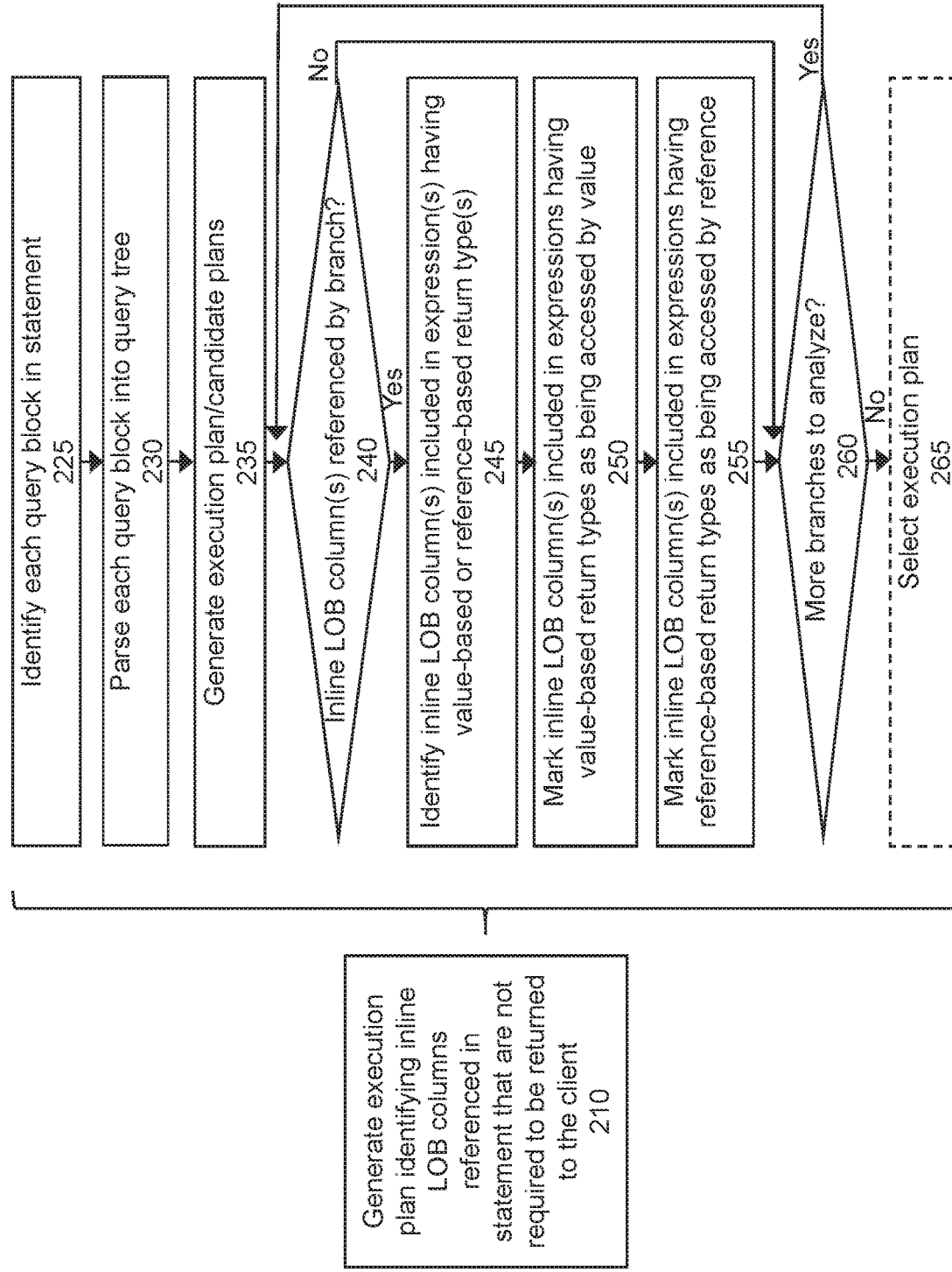
FIG. 2B is a flowchart for generating an execution plan identifying inline LOB columns referenced in a statement that are not required to be returned to a client according to some embodiments of the invention.

FIG. 2B is a flowchart for generating an execution plan identifying inline LOB columns referenced in a statement that are not required to be returned to a client according to some embodiments of the invention. In some embodiments, the steps may be performed in an order different from that described in FIG. 2B.

Figure 3A:
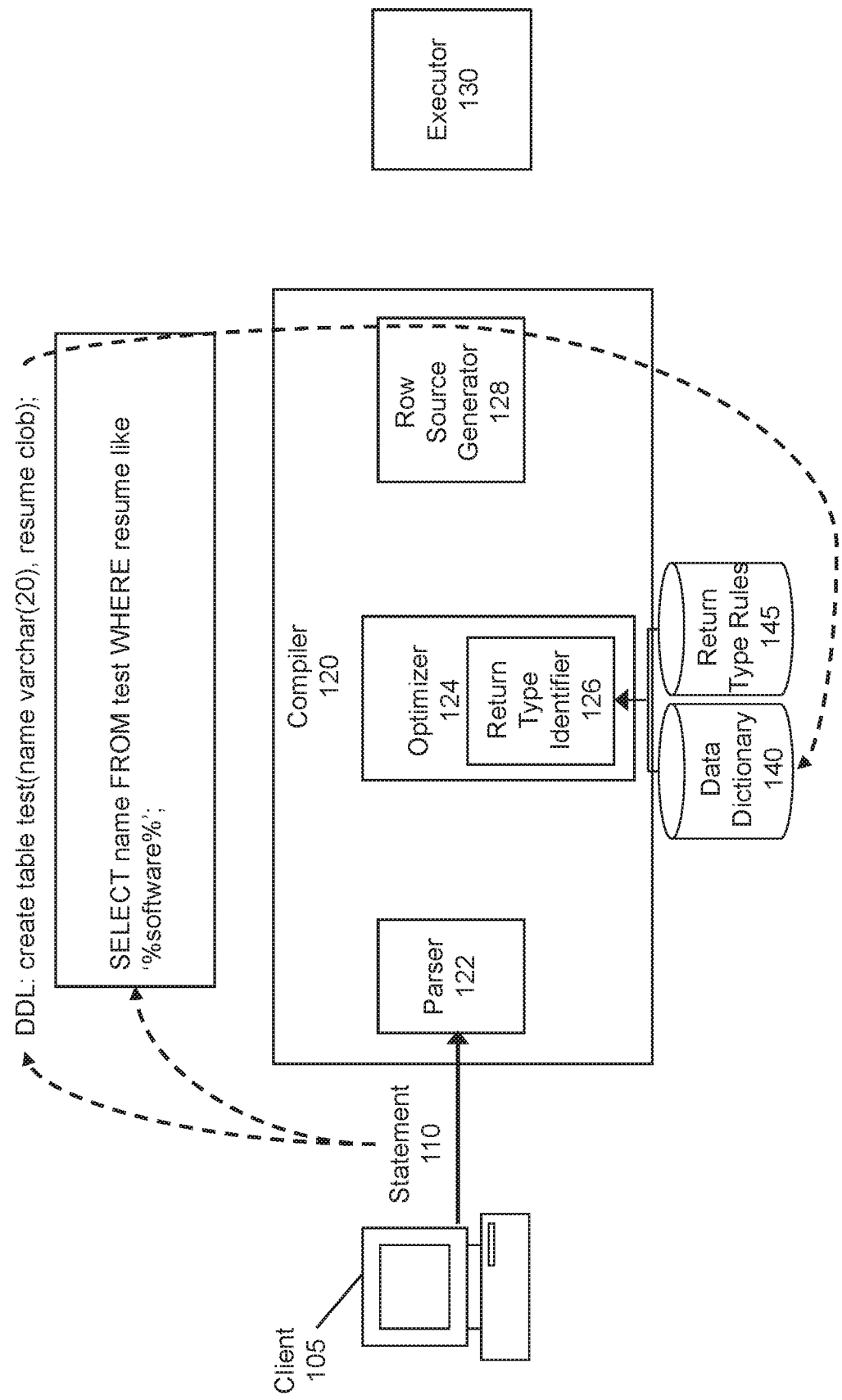
Figure 3B:
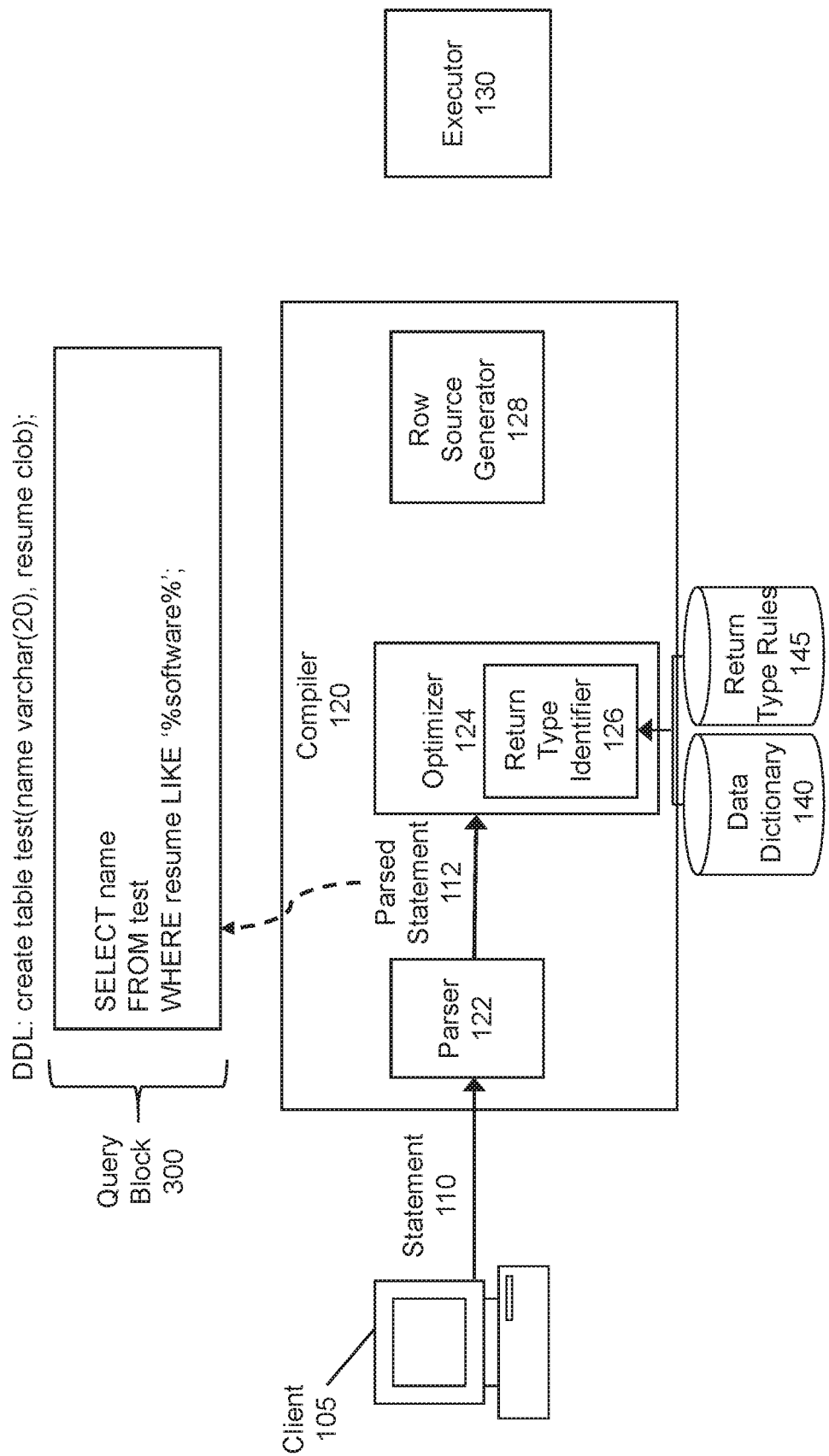

As illustrated in FIG. 2B, to generate (step 210) the execution plan 114 identifying inline LOB columns referenced in the statement 110 that are not required to be returned to the client 105, the optimizer 124 may identify (step 225) each query block in the statement 110 that is received (step 205). A query block may be identified (step 225) by a keyword (e.g., SELECT, INSERT, UPDATE, DELETE, or MERGE) that signals the beginning of the query block. For example, as shown in FIG. 3A, which illustrates an example of compiling a statement having LOB by value semantics, suppose that the following Data Definition Language (DDL) statement is received from the client 105: "create table test(name varchar(20), resume clob);" The RDBMS may modify the information stored in the data dictionary 140 to reflect the information received in the DDL statement (i.e., by creating the table named "test" having a varchar column named "name" and a CLOB column named "resume"). Suppose that subsequent to receiving the DDL statement, the following statement 110 is also received (step 205) from the client 105: "SELECT name FROM test WHERE resume like '% software %';" As illustrated in FIG. 3B, which continues the example discussed above with regard to FIG. 3A, the parsed statement 112 includes a single query block 300 that begins with the "SELECT" keyword.

Referring back to FIG. 2B, the optimizer 124 may parse (step 230) each query block 300 in the statement 110 into a query tree. A query block 300 may be parsed (step 230) based on the clauses within the query block 300. In various embodiments, each clause of a query block 300 may be identified by keywords, such as "SELECT," "FROM," "WHERE," "GROUP BY," "HAVING," "ORDER BY," and "CONNECT BY." In the example of FIG. 3B, the query block 300 includes three clauses, in which the first clause corresponds to "SELECT name," the second clause corresponds to "FROM test," and the third clause corresponds to "WHERE resume like '% software %';" In some embodiments, a query block 300 is parsed (step 230) into a query tree such that each branch of the query tree corresponds to a clause of the query block 300. Continuing with the above example with regard to FIGS. 3A-3B, as shown in FIG. 3C, since the query block 300 includes three clauses, the query block 300 may be parsed (step 230) into a query tree 302 having three branches.

In embodiments in which the statement 110 includes multiple query blocks 300, each query block 300 may be parsed (step 230) into a query tree 302, such that a query tree 302 corresponding to an outer query block 300 may have a branch that includes a query tree 320 corresponding to an inner query block 300 nested within the outer query block 300. For example, the statement 110 "SELECT name FROM dept IN (SELECT dept FROM hr.dept WHERE location_id=1600);" includes two query blocks 300 in which an outer query block 300 has an inner query block 300 ("SELECT dept FROM hr.dept WHERE location_id=1600") nested within it. In this example, the outer query block 300 may be parsed into a three-branch query tree 302, in which the last branch corresponds to the clause: "IN (SELECT dept FROM hr.dept WHERE location_id=1600);" Here, the portion of the last branch within parentheses corresponds to another three-branch query tree 302 in which the first branch corresponds to the clause "SELECT dept," the second branch corresponds to the clause "FROM hr.dept," and the third branch corresponds to the clause "WHERE location_id=1600."

Referring again to FIG. 2B, in some embodiments, once the optimizer 124 has parsed (step 230) each query block 300 in the statement 110 into a query tree 302, the optimizer 124 may generate (step 235) the execution plan 114 for executing the statement 110. The execution plan 114 may include a combination of multiple steps that describe how the statement 110 is to be executed. For example, the execution plan 114 may describe how each table referenced in the statement 110 is to be accessed. As an additional example, if the statement 110 specifies that two tables are to be joined, the execution plan 114 may describe how the tables are to be joined. In some embodiments, the optimizer 124 may generate (step 235) multiple candidate plans for executing the statement 110 and select (step 265) the most efficient candidate plan to be the execution plan 114. In such embodiments, each candidate plan may involve different access methods (e.g., full table scans or index scans), different join orders or methods, and different query transformations. The optimizer 124 may access a data dictionary 140, which provides information about each database controlled by the RDBMS (e.g., definitions of all schema objects, such as tables, functions, etc.) to generate (step 235) the execution plan 114/candidate plans. Furthermore, in embodiments in which the statement 110 includes multiple query blocks 300, the execution plan 114/each candidate plan generated (step 235) by the optimizer 124 may include a sub-execution plan for each query block 300.

The optimizer 124 may perform a top-down analysis of the query tree 302 to perform the remainder of the steps in FIG. 2B, as described below. For example, the optimizer 124 may begin the analysis with a branch corresponding to a SELECT clause, then progress to a branch corresponding to a FROM clause, etc. In some embodiments, the optimizer 124 may analyze the branches in a specific order. For example, the optimizer 124 may analyze FROM clauses first, followed by WHERE clauses, then the SELECT clauses, then the ORDER BY or GROUP BY clauses, etc. In embodiments in which the statement 110 includes multiple query blocks 300, the optimizer 124 may perform the analysis in a top-down recursive manner.

Figure 3D:
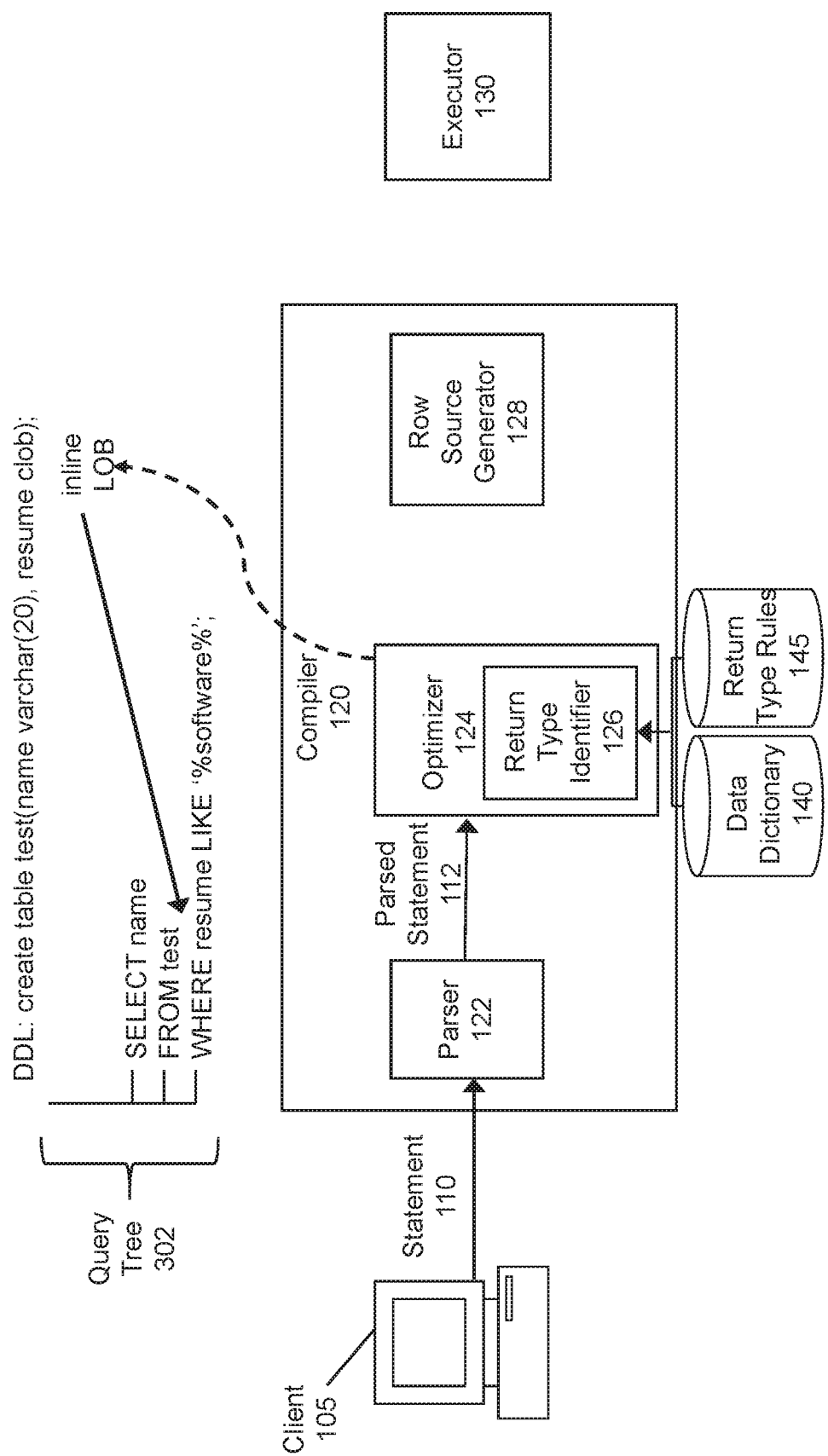

When analyzing each branch of the query tree 302, the optimizer 124 may first determine (step 240) whether there are inline LOB columns referenced by the branch. Continuing with the example discussed with respect to FIGS. 3A-3C, the optimizer 124 may analyze the first two branches of the query tree 302 (i.e., the branches corresponding to the clauses "SELECT name" and "FROM test") and determine (step 240) that there are no inline LOB columns referenced by these branches. As shown in FIG. 2B, after making this determination for each of the first two branches of the query tree 302, the optimizer 124 will skip to step 260 and determine (step 260) whether there are any more branches to analyze. Since the query tree 302 in the example illustrated in FIGS. 3A-3C includes a third branch, the optimizer 124 will determine (step 260) that there is another branch to analyze and will then return to step 240 to determine (step 240) if there are any inline LOB columns referenced by the third branch. As illustrated in FIG. 3D, which continues the example discussed above with regard to FIGS. 3A-3C, when the optimizer 124 analyzes the third branch of the query tree 302 ("WHERE resume like '% software %';"), the optimizer 124 may determine (step 240) that resume is an inline LOB column based on information stored in the data dictionary 140 indicating storage properties for the column.

Figure 3E:
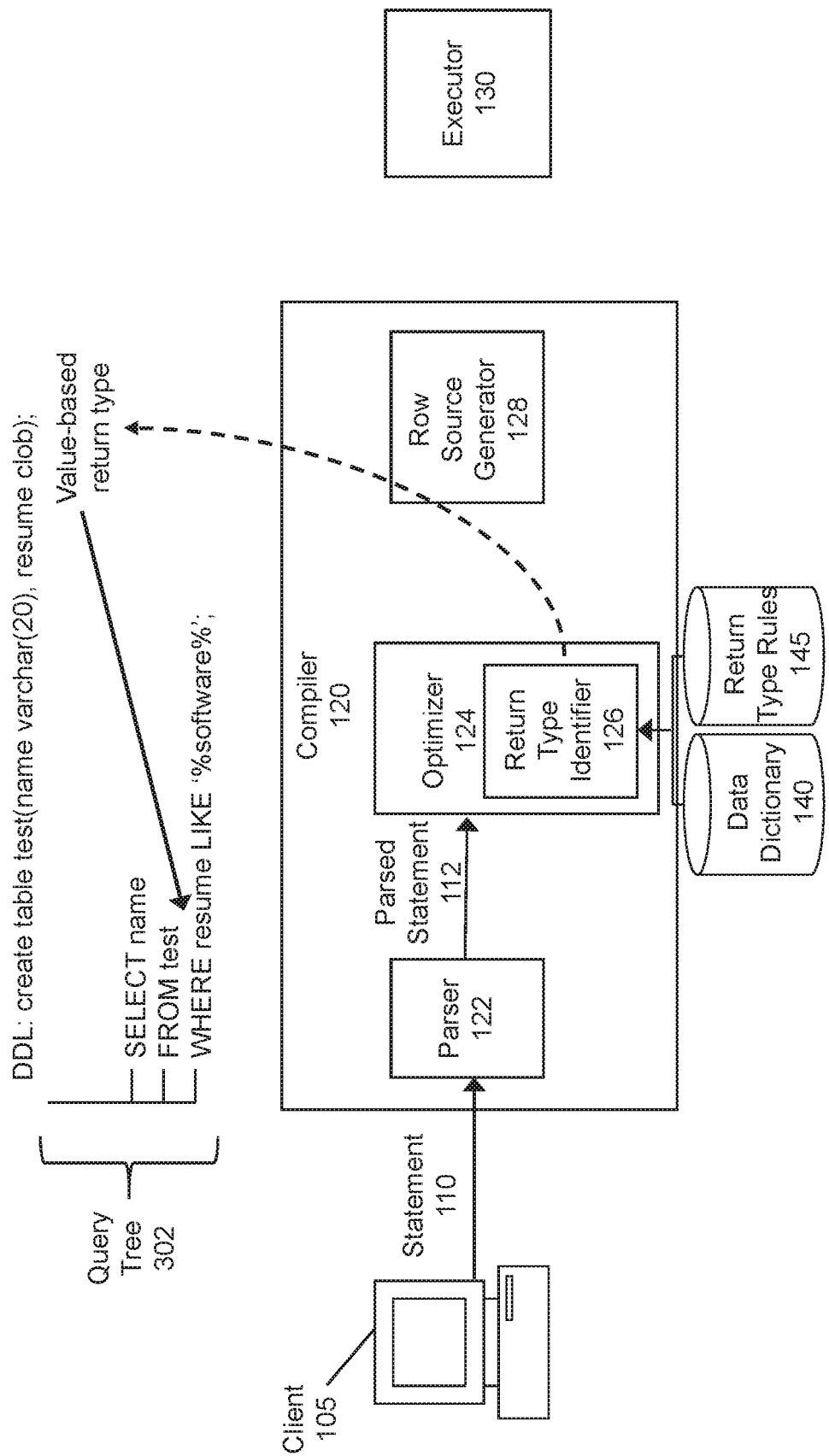

As illustrated in FIG. 2B, if the optimizer 124 determines (step 240) that one or more inline LOB columns are referenced by a branch of the query tree 302, the optimizer 124 may identify (step 245) inline LOB columns that are included in one or more expressions having value-based return type(s) or reference-based return type(s). The return type identifier 126 of the optimizer 124 may make this identification based on the semantics of an expression included in the statement 110 and one or more return type rules 145. A return type rule 145 may correlate an expression with a return type for the expression based on the semantics of the expression. In some embodiments, a return type rule 145 may correlate an expression having an inline LOB column included at the top of a select list with a reference-based return type. For example, the expression "SELECT resume FROM test," in which resume is an inline LOB column, is correlated with a reference-based return type since resume is at the top of the select list. As an additional example, the return type rules 145 may include a rule specifying that expressions including the keywords "INSERT SELECT" or "CREATE TABLE . . . AS" have a value-based return type since the semantics of such expressions indicate that a LOB column is never required to be returned to the client 105. As an additional example, the return type rules 145 may include a rule specifying that expressions having certain functions that map the result of LOB data evaluation into relational rows and columns (e.g., XMLTABLE( ) and JSON_TABLE( )) have a value-based return type by default since a LOB column is never required to be returned to the client 105. As yet another example, the return type rules 145 may include a rule specifying that expressions having PL/SQL elements have a reference-based return type by default. As illustrated in FIG. 3E, which continues the example discussed above with regard to FIGS. 3A-3D, since the LIKE operator in the third branch of the query tree 302 is used to search for values that start or end with "software" in the resume column, the return type identifier 126 may determine that the return type for the expression that includes resume is Boolean since it returns true if the value is found in the resume column and returns false otherwise. Therefore, the return type identifier 126 will identify (step 245) the resume column to be an inline LOB column included in an expression having a value-based return type.

Figure 3F:
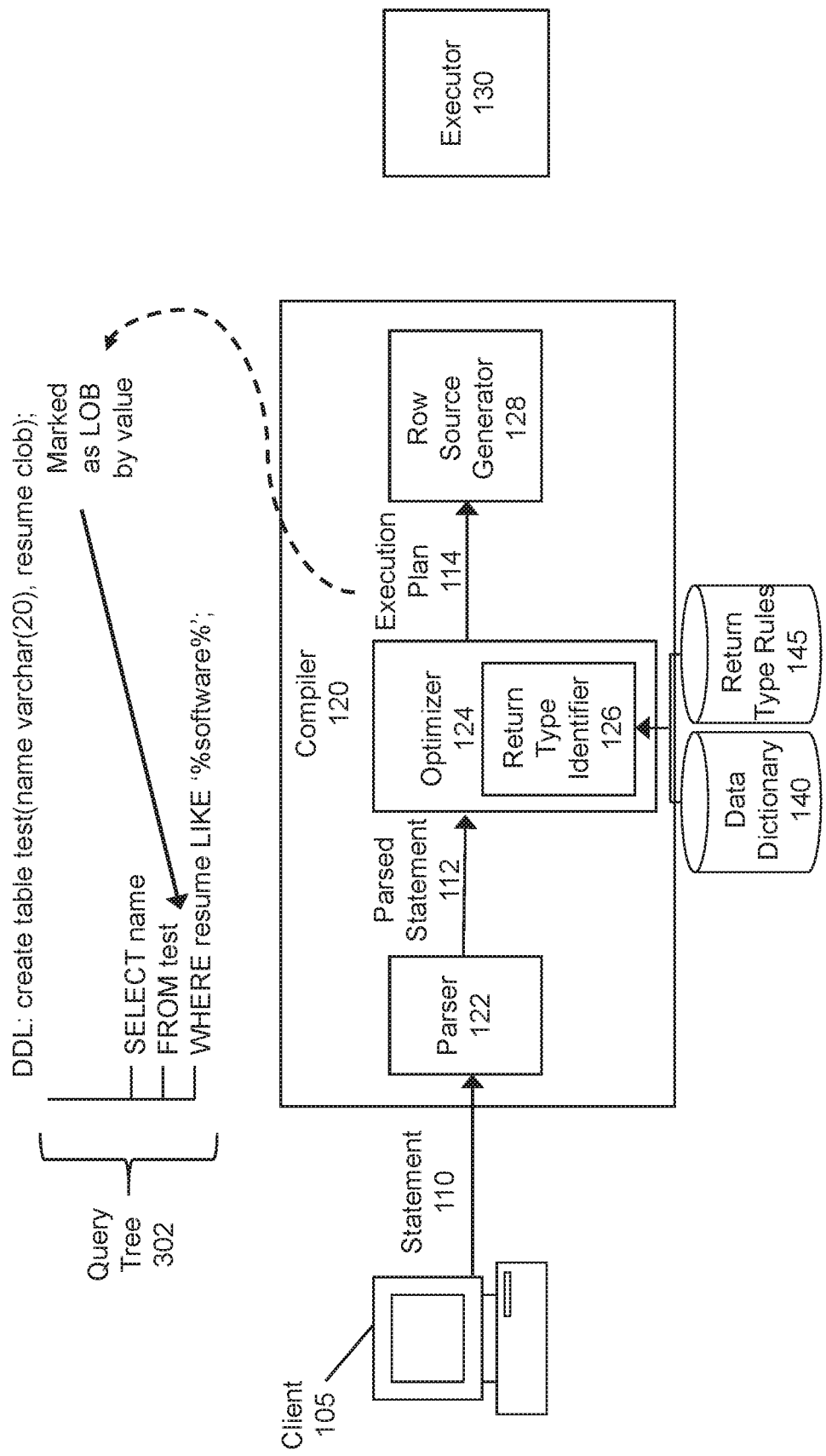

Referring again to FIG. 2B, in some embodiments, once the return type identifier 126 has identified (step 245) inline LOB column(s) included in expressions having value-based return type(s) or reference-based return type(s), this information may be indicated in the execution plan 114/candidate plans. The optimizer 124 may indicate this information by marking (step 250) the inline LOB column(s) included in expressions having value-based return types as being accessed by value in the execution plan 114/candidate plans and/or by marking (step 255) the inline LOB column(s) included in expressions having reference-based return types as being accessed by reference in the execution plan 114/candidate plans. Continuing with the above example with regard to FIGS. 3A-3E, as shown in FIG. 3F, since the return type identifier 126 identified (step 245) the resume column as an inline LOB column included in an expression having a value-based return type, the optimizer 124 will mark (step 250) resume as being accessed by value in the execution plan 114 (e.g., marked as "LOB by value").

Referring back to FIG. 2B, the optimizer 124 may then determine (step 260) if there are any more branches in the query tree 302 to analyze. If there are more branches to analyze, the optimizer 124 will return to step 240 and perform a similar analysis on the next branch to be analyzed, as just described. In some embodiments, if there are no more branches to analyze, the optimizer 124 has completed generating (step 210) the execution plan 114 identifying inline LOB columns referenced in the statement 110 that are not required to be returned to the client 105.

In embodiments in which the optimizer 124 generates (step 235) multiple candidate plans, generation (step 210) of the execution plan 114 may be completed when the optimizer 124 selects (step 265) an execution plan 114 from the candidate plans based on an estimated cost associated with each candidate plan. The optimizer 124 may compute the estimated cost associated with a candidate plan based on the computing resources required to execute the candidate plan, based on the time required to execute the candidate plan, or based on any other suitable measure of cost that may be associated with a candidate plan. The optimizer 124 may access the data dictionary 140 to retrieve information about various schema objects to compute an estimated cost of each candidate plan. For example, the optimizer 124 may compute an estimated cost of a candidate plan in terms of I/O and CPU resources required to retrieve data from various tables to execute the candidate plan. Once the optimizer 124 has computed an estimated cost associated with each candidate plan, the optimizer 124 may compare the estimated cost of each candidate plan and select (step 265) the candidate plan with the lowest estimated cost (i.e., the most efficient candidate plan) to be the execution plan 114. Since the candidate plan selected (step 265) by the optimizer 124 to be the execution plan 114 may have inline LOB column(s) that were marked (step 250) by the optimizer 124 as being accessed by value and/or inline LOB column(s) that were marked (step 255) by the optimizer 124 as being accessed by reference, these markers will be included in the execution plan 114 as well.

Figure 3G:
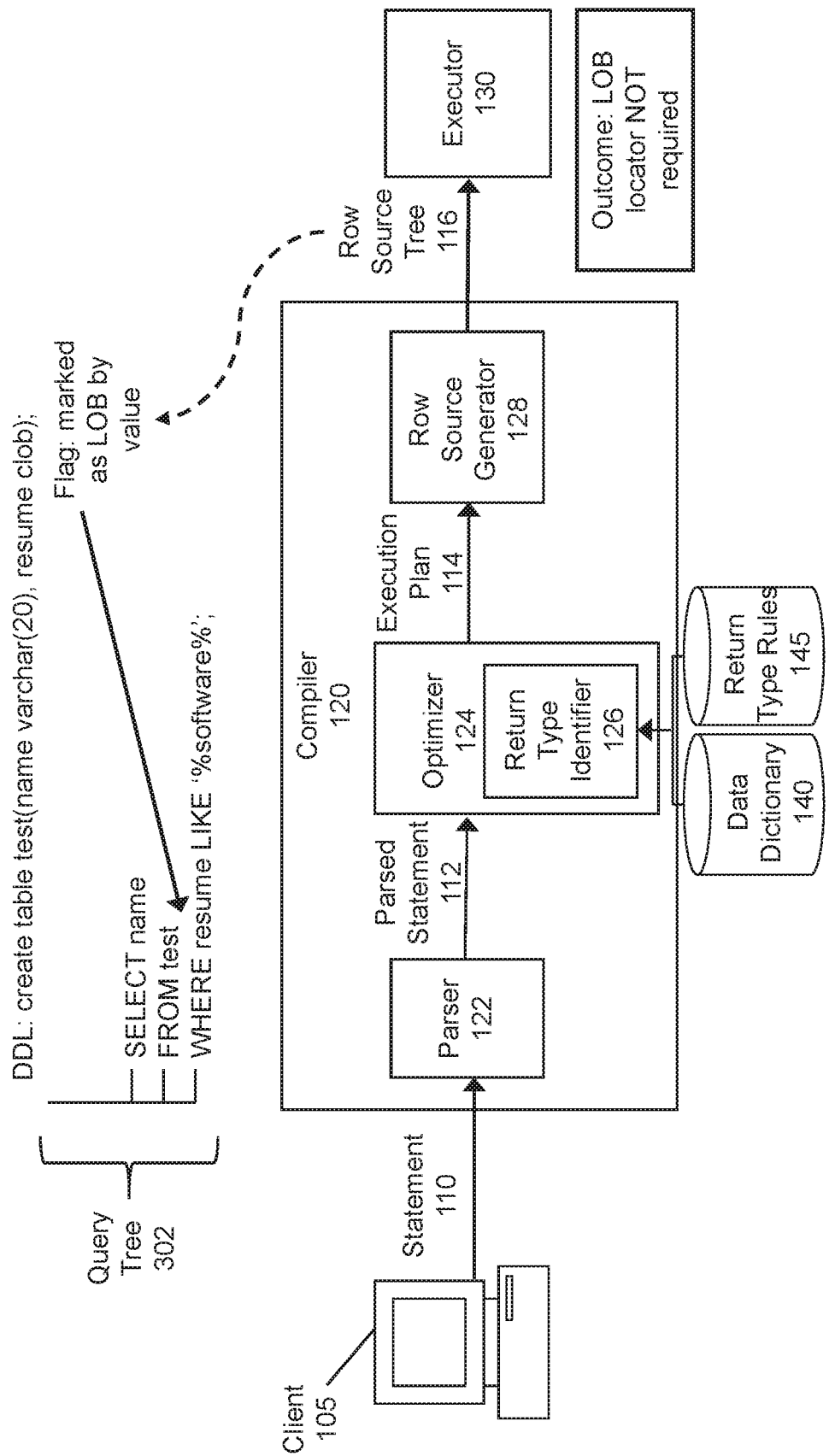

Once the optimizer 124 has generated (step 210) the execution plan 114, the optimizer 124 may pass the execution plan 114 to the row source generator 128 so that a row source tree 116 may be generated (step 215). The row source tree 116 may indicate whether a LOB locator is required to be generated based on whether an inline LOB column was marked (step 250) by the optimizer 124 as being accessed by value and/or whether an inline LOB column was marked (step 255) by the optimizer 124 as being accessed by reference. As shown in the example of FIG. 3G, which continues the example discussed above with regard to FIGS. 3A-3F, since the optimizer 124 marked (step 250) resume as being accessed by value in the execution plan 114, the row source tree 116 may include a flag indicating that access to resume was marked as "LOB by value" in the execution plan 114. The row source tree 116 may be passed to the executor 130 so that the statement 110 may be executed (step 220). Since the row source tree 116 includes the flag indicating that access to resume was marked as "LOB by value" in the execution plan 114, execution (step 220) of the statement 110 will not require a LOB locator to be created.

Figure 4A:
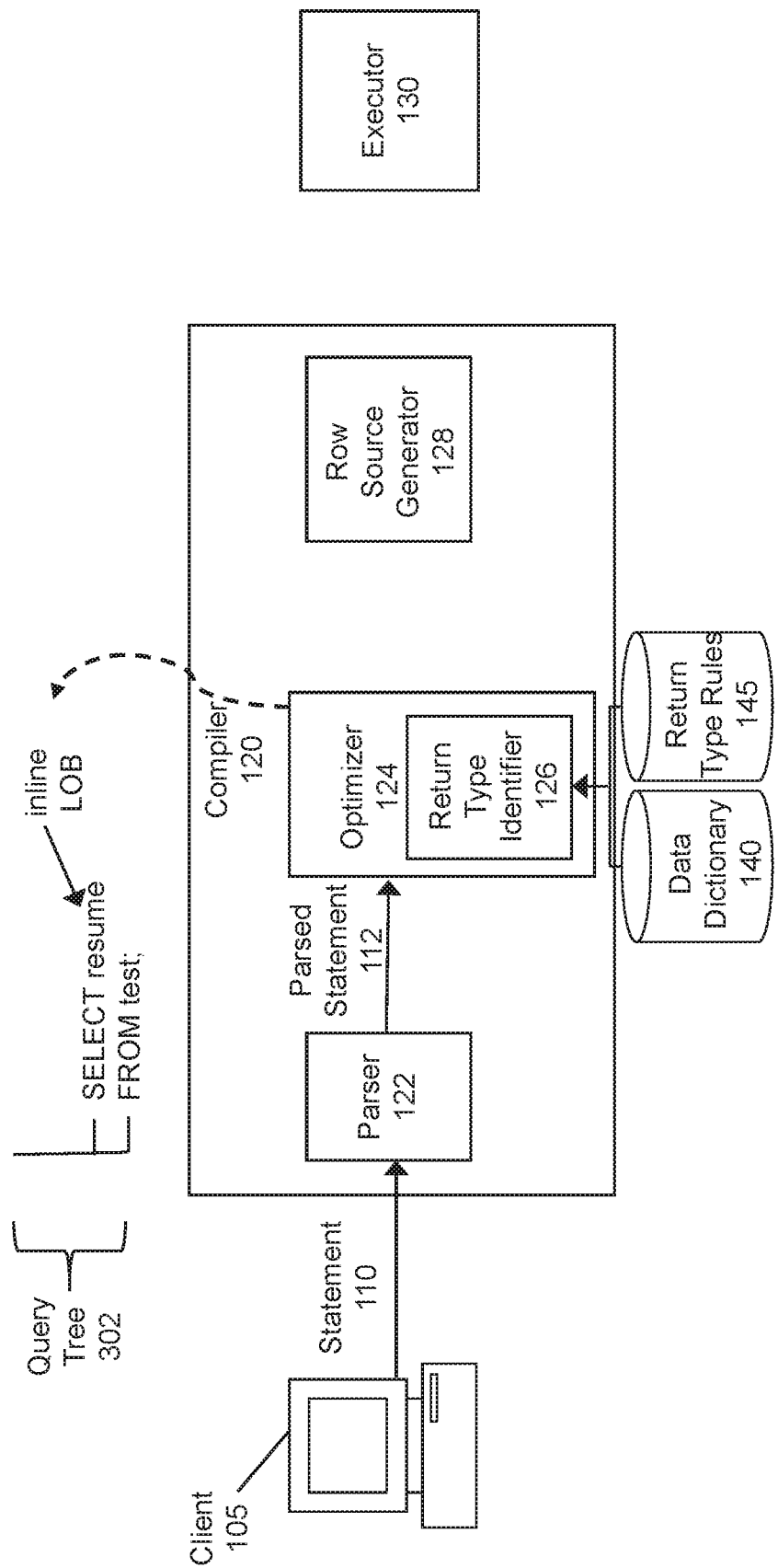
FIGS. 4A-4D illustrate an example of compiling a statement having LOB by reference semantics according to some embodiments of the invention.

To illustrate an example of how the compiler 120 would compile a statement 110 having LOB by reference semantics, some of the steps of FIG. 2B will now be discussed in conjunction with FIGS. 4A-4D, which illustrate an example of compiling a statement having LOB by reference semantics according to some embodiments of the invention. Referring first to FIG. 4A, suppose that after receiving (step 205) the DDL statement and the statement 110 discussed in the examples of FIGS. 3A-3G, the following statement 110 is also received (step 205): "SELECT resume FROM test;" Once the optimizer 124 has identified (step 225) each query block 300 in the statement 110 and has parsed (step 230) the query block 300 into a query tree 302 having two branches, the optimizer 124 may generate (step 235) the execution plan 114/candidate plans for executing the statement 110, as described above.

Figure 4B:
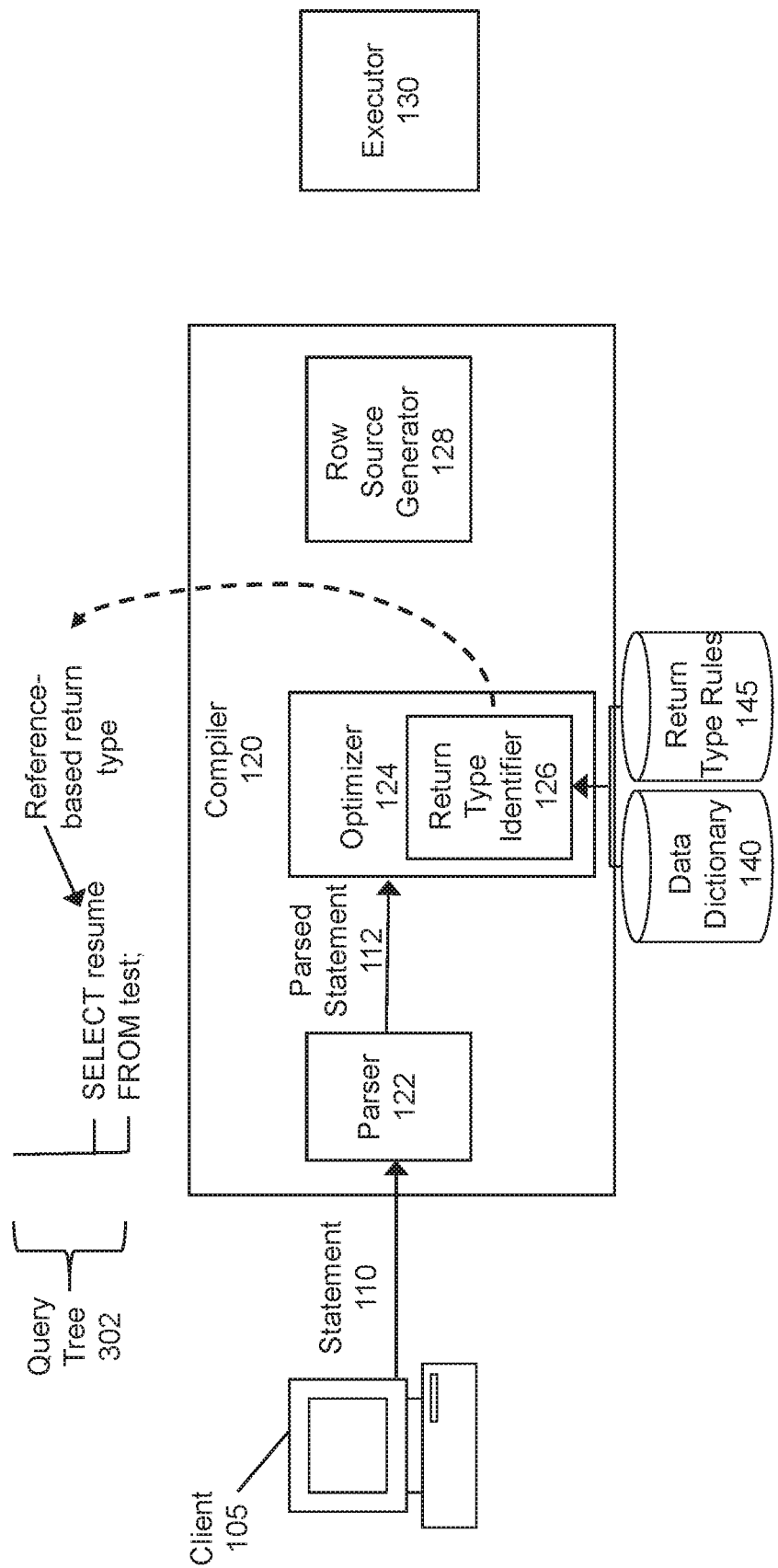

The optimizer 124 may then analyze the first branch of the query tree 302 ("SELECT resume"), and once again determine (step 240) that resume is an inline LOB column based on information stored in the data dictionary 140. The return type identifier 126 of the optimizer 124 may then identify (step 245) this column as a column that is included in an expression having a value-based return type or a reference-based return type based on the semantics of the expression included in the first branch and one or more return type rules 145. As illustrated in FIG. 4B, since the resume column is the only object referenced in the select list, the return type identifier 126 may determine that the return type for this expression is a LOB datatype. Therefore, the return type identifier 126 will identify (step 245) the resume column as an inline LOB column included in an expression having a reference-based return type.

Figure 4C:
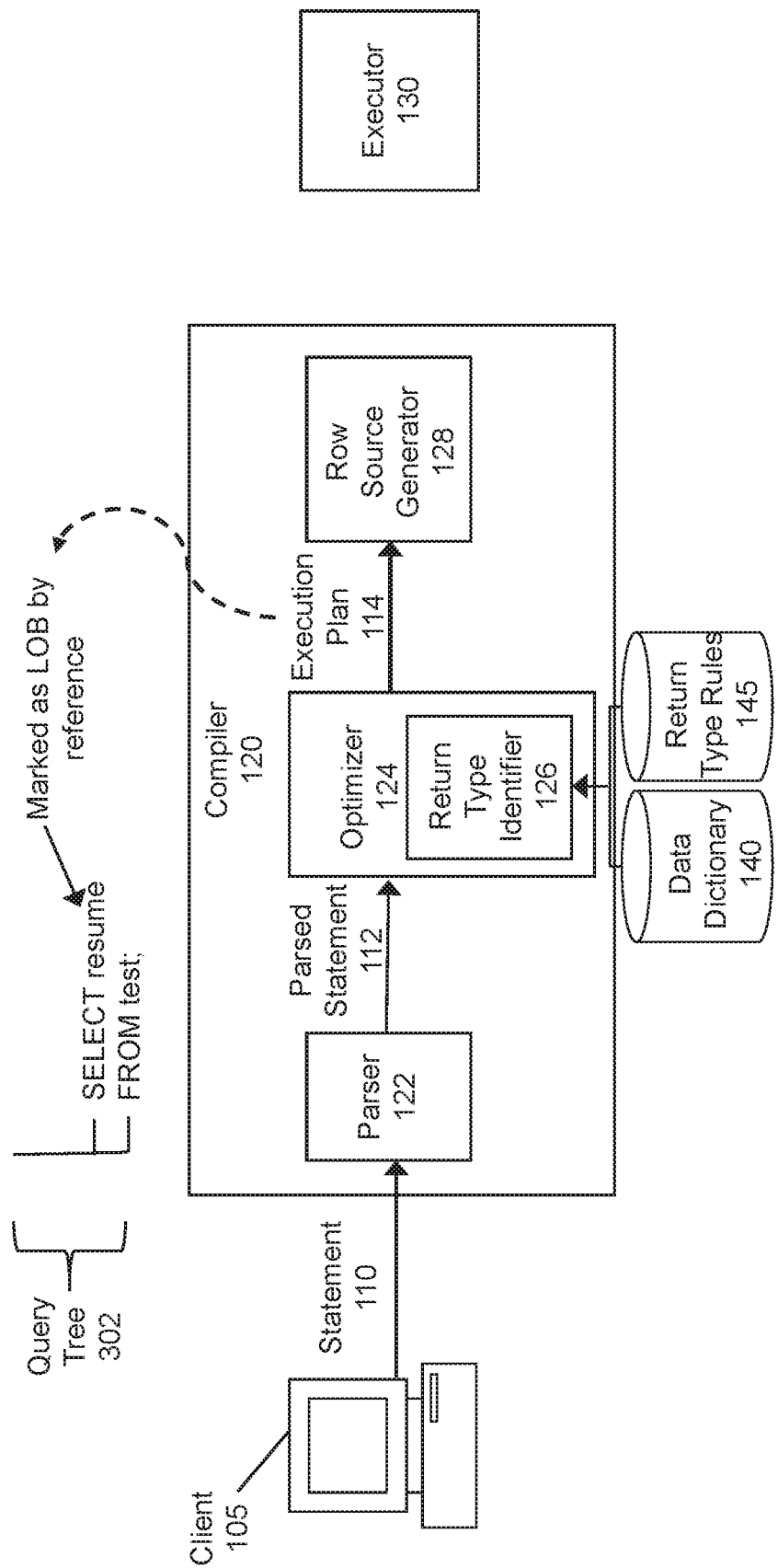

In some embodiments, once the return type identifier 126 has identified (step 245) the inline LOB column(s) included in expressions having value-based return type(s) or reference-based return type(s), this information may be indicated in the candidate plans/execution plan 114. As described above, the optimizer 124 may indicate this information by marking (step 250) the inline LOB column(s) included in expressions having value-based return types as being accessed by value in the execution plan 114/candidate plans and/or by marking (step 255) the inline LOB column(s) included in expressions having reference-based return types as being accessed by reference in the execution plan 114/ candidate plans. For example, as shown in FIG. 4C, since the return type identifier 126 identified (step 245) the resume column as an inline LOB column included in an expression having a reference-based return type, the optimizer 124 will mark (step 255) resume as being accessed by reference in the execution plan 114 (e.g., marked as "LOB by reference").

At this point, the optimizer 124 may determine (step 260) that there is still a second branch of the query tree 302 to analyze (i.e., "FROM test;"). The optimizer 124 will return to step 240 and determine (step 240) that there are no inline LOB columns referenced by this second branch and skip to step 260. In some embodiments, if the optimizer 124 determines (step 260) that there are no more branches in the query tree 302 to analyze, the optimizer 124 has completed generating (step 210) the execution plan 114 identifying inline LOB columns referenced in the statement 110 that are not required to be returned to the client 105.

In embodiments in which the optimizer 124 generates (step 235) multiple candidate plans, the optimizer 124 may select (step 265) an execution plan 114 from the candidate plans based on an estimated cost associated with each candidate plan. As described above, since the candidate plan selected (step 265) by the optimizer 124 to be the execution plan 114 may have inline LOB column(s) that were marked (step 250) by the optimizer 124 as being accessed by value and/or inline LOB column(s) that were marked (step 255) by the optimizer 124 as being accessed by reference, these markers will be included in the execution plan 114 as well.

Figure 4D:
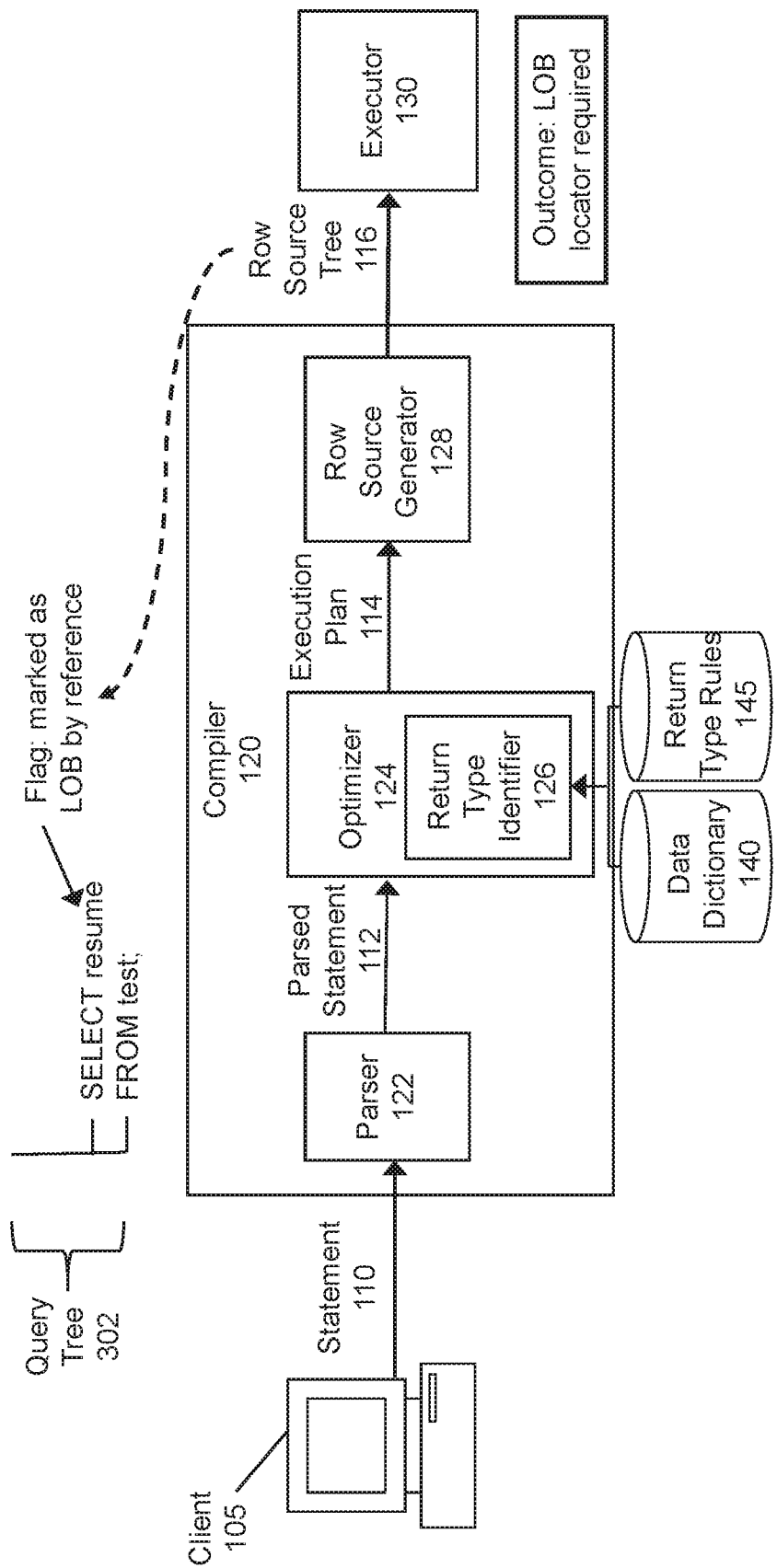

Once the optimizer 124 has generated (step 210) the execution plan 114, the optimizer 124 may pass the execution plan 114 to the row source generator 128 so that a row source tree 116 may be generated (step 215). Each row source of the row source tree 116 is generated (step 215) upon execution of a step of the execution plan 114. The row source tree 116 may indicate whether a LOB locator is required to be generated based on whether an inline LOB column was marked (step 250) by the optimizer 124 as being accessed by value and/or whether an inline LOB column was marked (step 255) by the optimizer 124 as being accessed by reference. As shown in the example of FIG. 4D, since the optimizer 124 marked (step 255) resume as being accessed by reference in the execution plan 114, the row source tree 116 may include a flag indicating that access to resume was marked as "LOB by reference" in the execution plan 114. After the row source generator 128 has generated (step 215) the row source tree 116, the row source tree 116 may be passed to the executor 130 so that the statement 110 may be executed (step 220). Since the row source tree 116 includes the flag indicating that access to resume was marked as "LOB by reference" in the execution plan 114, execution (step 220) of the statement 110 will require a LOB locator to be created.

FIG. 5 is a flow chart for executing a statement according to a row source tree according to some embodiments of the invention. Some of the steps illustrated in the flowchart are optional in different embodiments. In some embodiments, the steps may be performed in an order different from that described in FIG. 5.

Figure 6A:
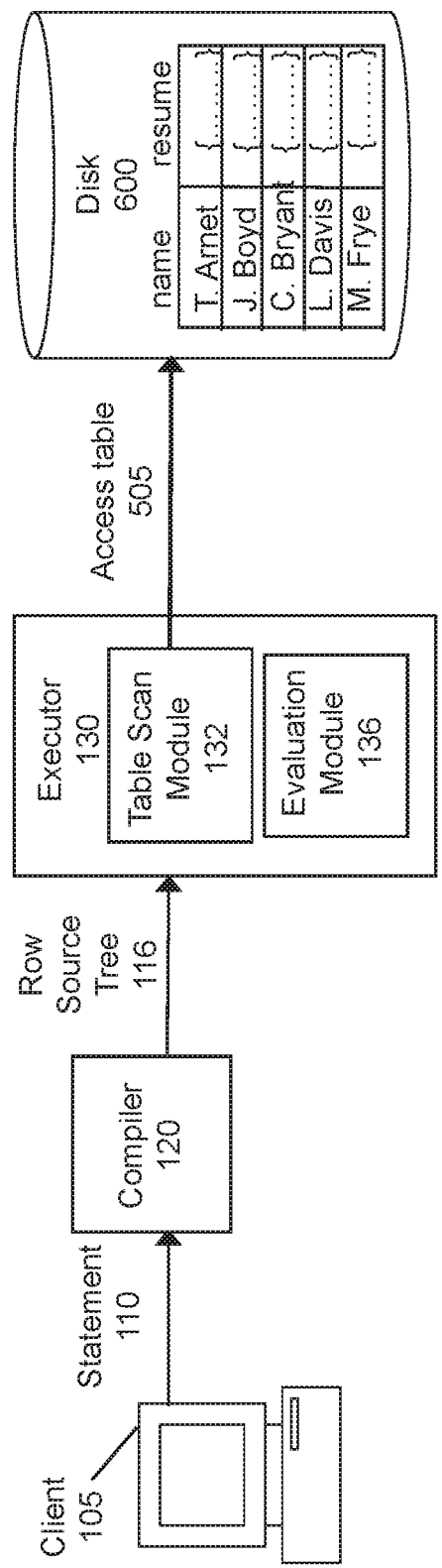
FIGS. 6A-6D illustrate an example of executing a statement having LOB by value semantics according to some embodiments of the invention.

In FIG. 5, the flowchart begins when the table scan module 132 of the executor 130 accesses (step 505) one or more tables upon execution of a row source of the row source tree 116 generated by the row source generator 128. During execution (step 220) of the statement 110, the table scan module 132 may access (step 505) an inline LOB column from disk. For example, as shown in FIG. 6A, which illustrates an example of executing a statement having LOB by value semantics, once the executor 130 has received the row source tree 116 generated by the row source generator 128 of the compiler 120, the table scan module 132 may attempt to access (step 505) a table referenced in the statement 110 from disk 600.

Figure 6B:
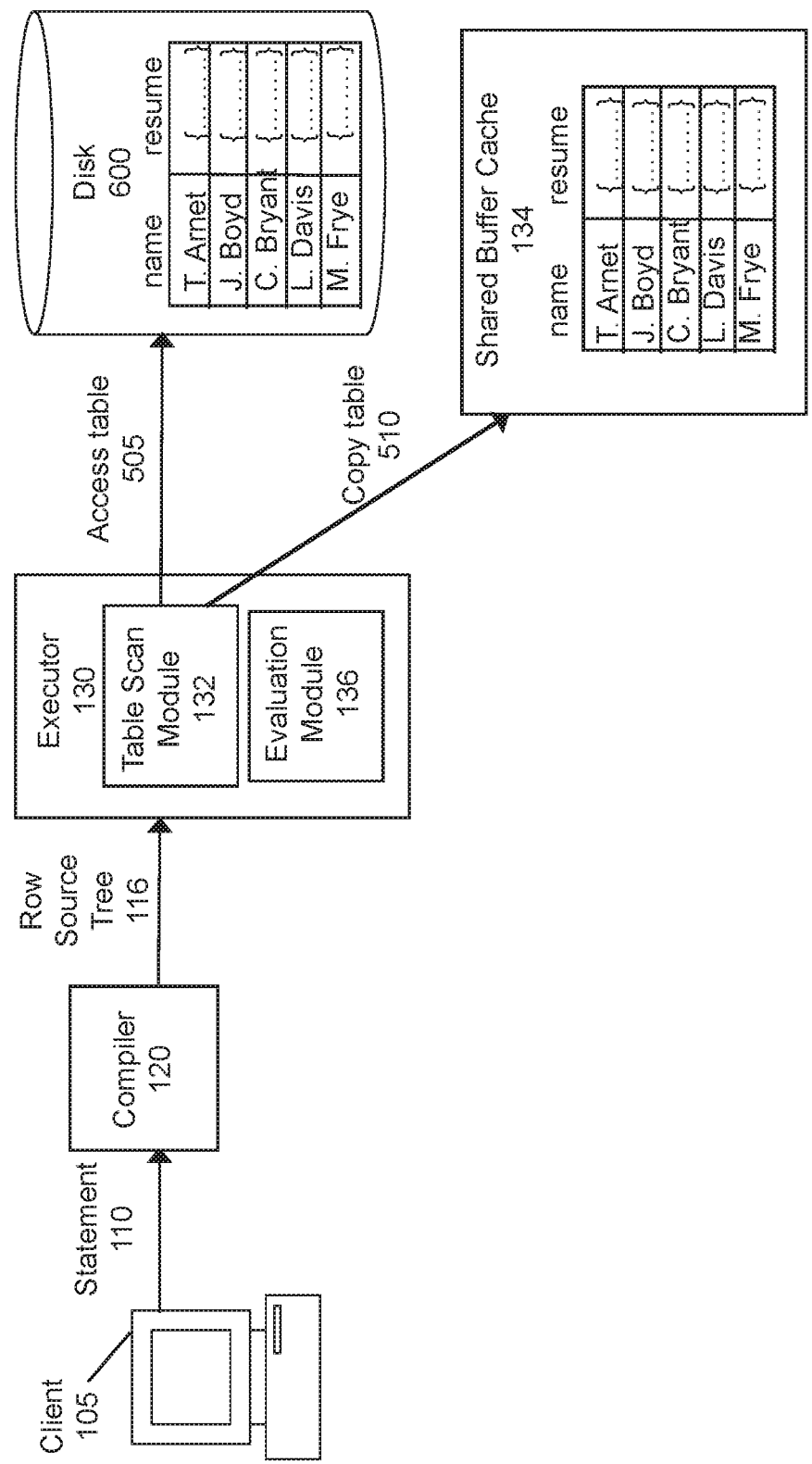

Referring back to FIG. 5, the table(s) accessed (step 505) from disk 600 may be copied (step 510) to the shared buffer cache 134. For example, as depicted in FIG. 6B, which continues the example discussed above with regard to FIG.

6A, the table that was accessed (step 505) from disk 600 is copied (step 510) to the shared buffer cache 134. As described above, the shared buffer cache 134 is a buffer cache that is shared by all database server and background processes for one database instance.

As shown in FIG. 5, the table scan module 132 may then determine (step 515) if the row source tree 116 indicates that there are any inline LOB columns included in the table that are being accessed by reference. The table scan module 132 may make this determination by examining the row source tree 116 to determine whether a row source being executed includes a flag indicating how an inline LOB column is to be accessed. For example, if a flag indicates that access to the inline LOB column is marked as "LOB by reference," the table scan module 132 may determine (step 515) that there is an inline LOB column being accessed by reference; otherwise (e.g., if a flag indicates that access to the inline LOB column is marked as "LOB by value"), the table scan module 132 may determine (step 515) that there is no inline LOB column being accessed by reference. In some embodiments, the table scan module 132 may determine (step 515) if the row source tree 116 indicates that there are any inline LOB columns included in the table that are being accessed by reference based on the absence of a flag. For example, the table scan module 132 may determine (step 515), by default, that the row source tree 116 indicates that there are no inline LOB columns included in the table that are being accessed by reference if access to the LOB columns was not marked as "LOB by reference."

Figure 6C:
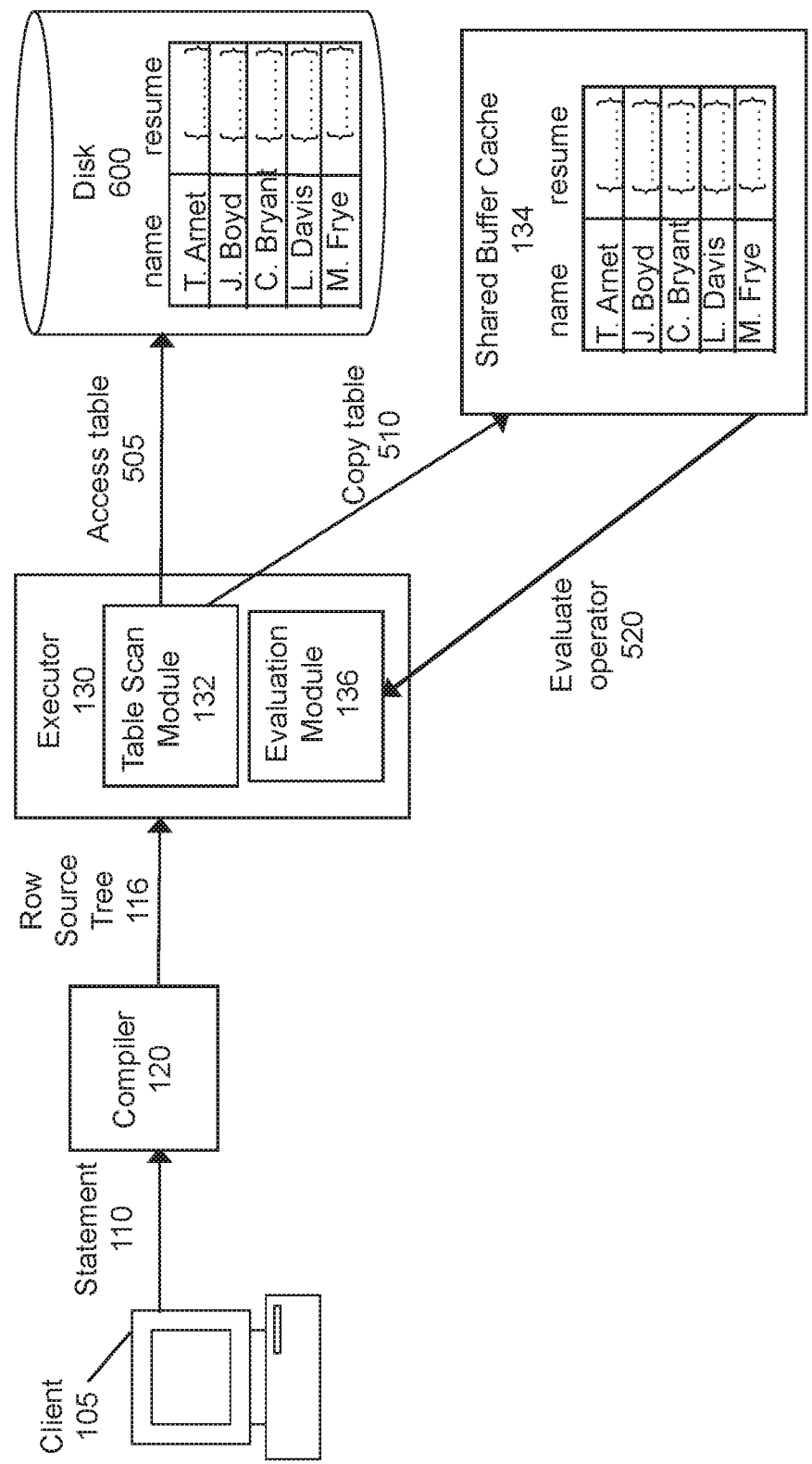

If the table scan module 132 determines (step 515) that there are no inline LOB columns included in the table that are being accessed by reference, the table scan module 132 may set up access to the inline LOB column with a pointer that directly points to the inline LOB content in the shared buffer cache 134. The inline LOB content may then be fed from the shared buffer cache 134 to an operator (e.g., an SQL operator or predicate). As shown in FIG. 5, the operator may then be evaluated (step 520) using the inline LOB content. Continuing with the above example with regard to FIGS. 6A-6B, as shown in FIG. 6C, the evaluation module 136 may evaluate (step 520) the operator (e.g., WHERE resume LIKE '% software %') using the content in the resume column in the shared buffer cache 134.

Figure 6D:
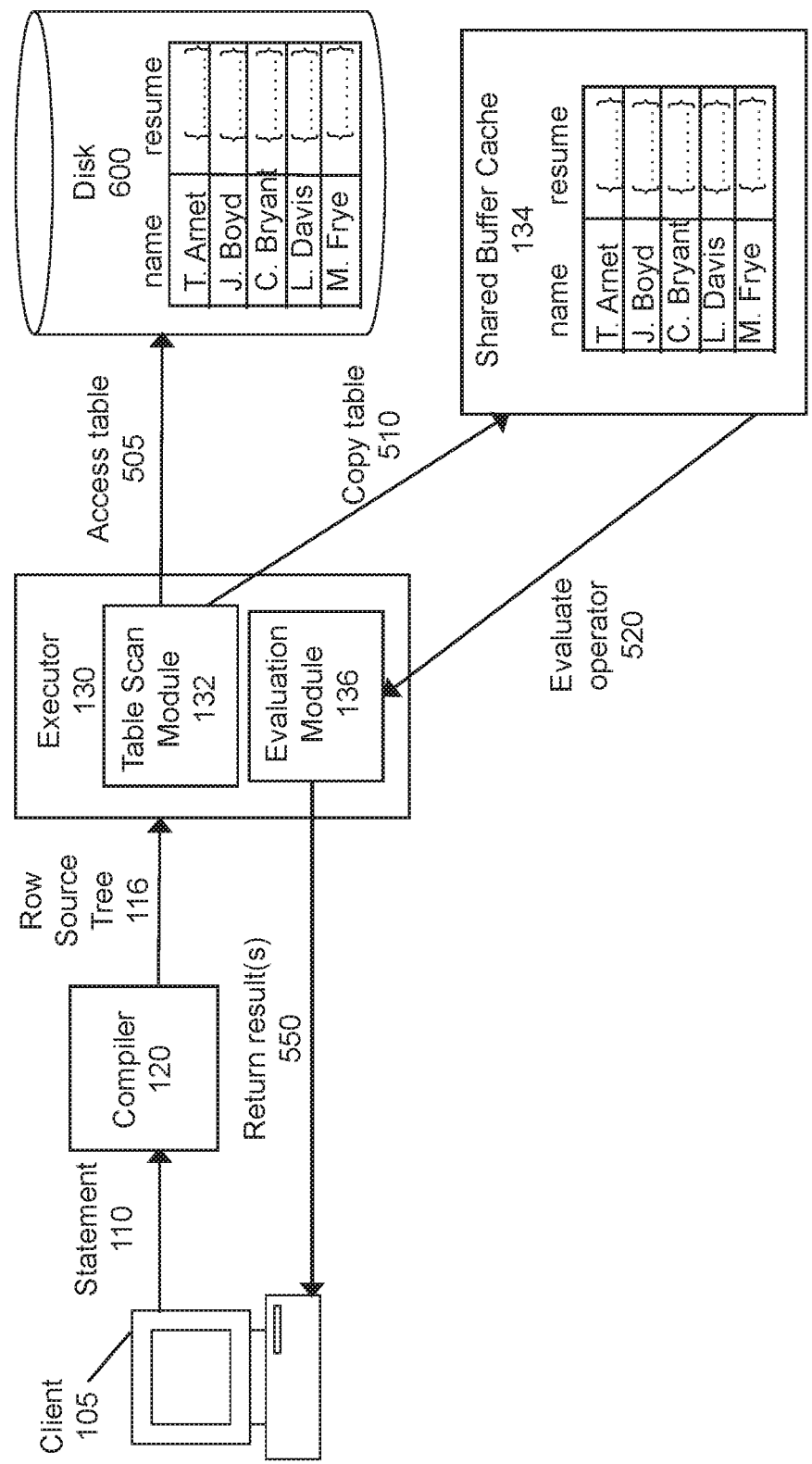

Referring again to FIG. 5, after the evaluation module 136 has evaluated (step 520) an operator using data in the shared buffer cache 134, the executor 130 may determine (step 545) whether there are any more row sources in the row source tree 116 to process. If so, steps of the execution process may be repeated again at step 505. If not, the executor 130 may return (step 550) a set of results to the client 105. For example, as shown in the example of FIG. 6D, which continues the example discussed above with regard to FIGS. 6A-6C, since no LOB locators are generated (step 540) for the inline LOB column, one or more results are returned (step 550) to the client 105 absent any LOB locators.

Figure 7A:
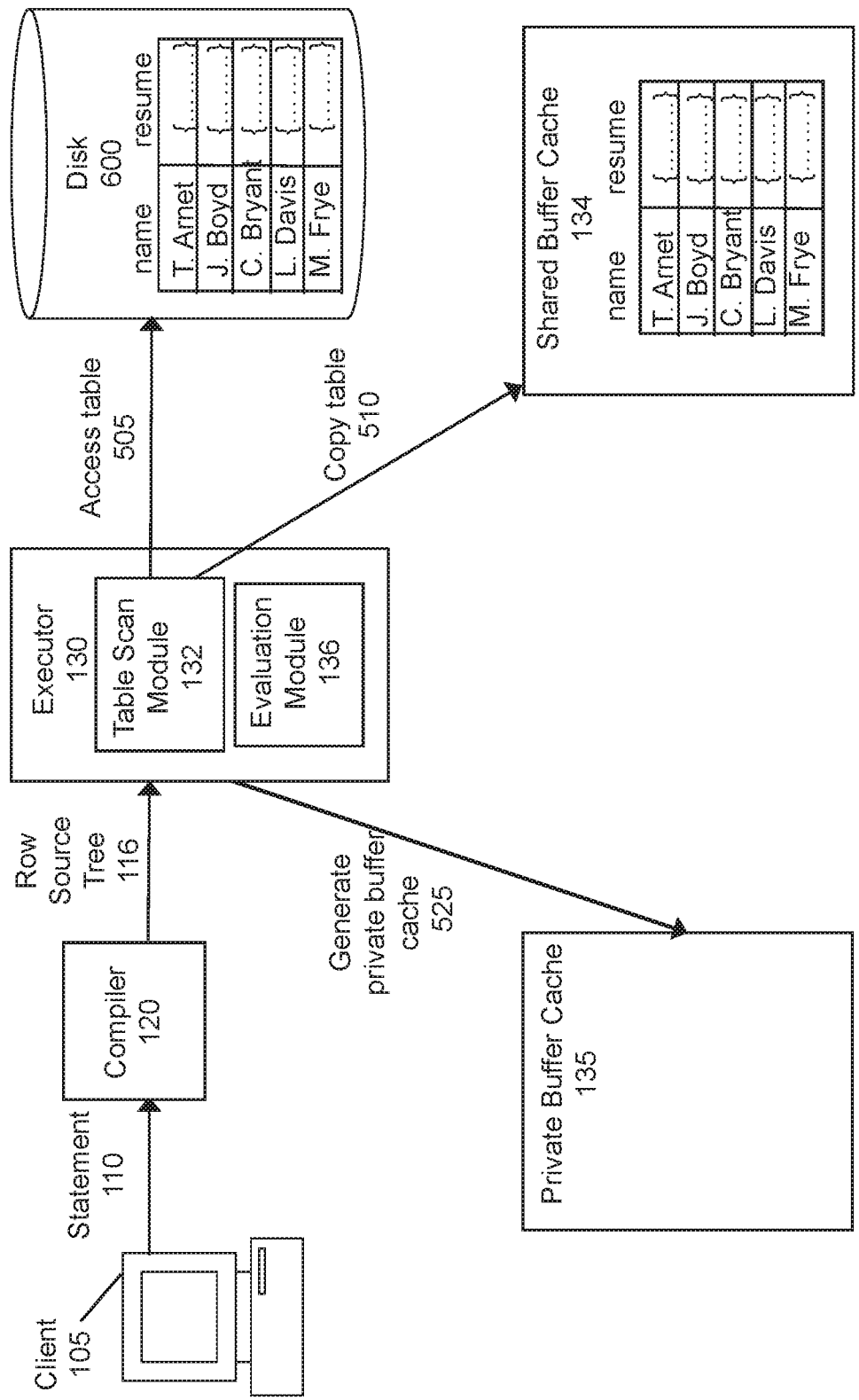
Figure 7B:
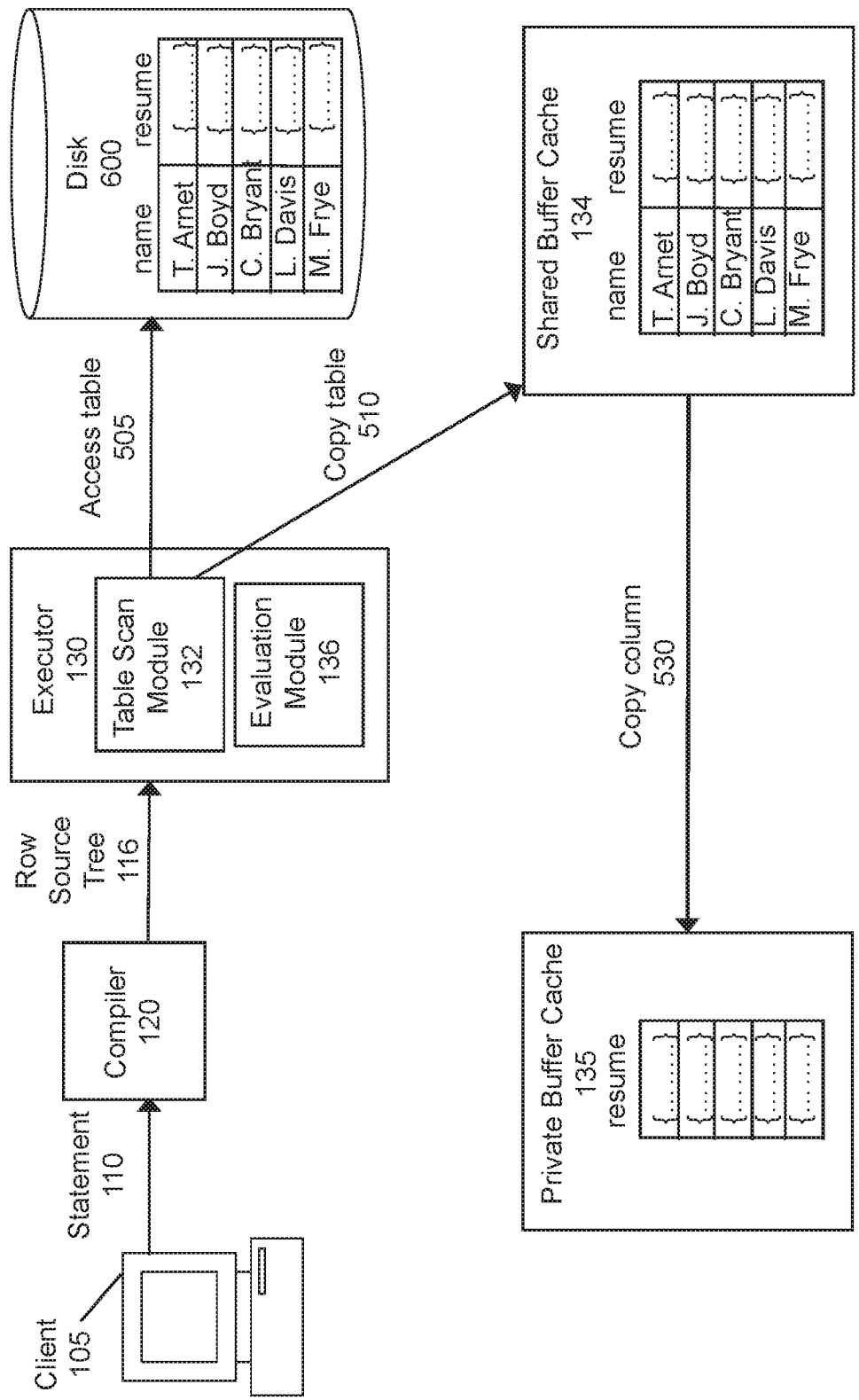

If, however, the executor 130 determines (step 515) that there are inline LOB columns included in the table that are being accessed by reference, the executor 130 may perform additional steps before further execution may be performed. As indicated in FIG. 5, in some embodiments, the table scan module 132 generates (step 525) a temporary staging buffer area (e.g., a private buffer cache 135) that is specific to the client's session as illustrated in the example of FIG. 7A, which illustrates an example of executing a statement having LOB by reference semantics. Then, as shown in FIG. 5, the corresponding inline LOB column may be copied (step 530) from the shared buffer cache 134 to the private buffer cache 135. As illustrated in the example of FIG. 7B, which continues the example discussed above with regard to FIG. 7A, after the table scan module 132 has accessed (step 505) the table from disk 600 and has copied (step 510) the table to the shared buffer cache 134, if the table scan module 132 determines (step 515) that the row source being executed indicates that resume is an inline LOB column being accessed by reference, the table scan module 132 may copy (step 530) the inline LOB column and the rowid to a private buffer cache 135 that is specific to the client 105. The table scan module 132 may also copy query snapshot information to the private buffer cache 135 as well, allowing the LOB content corresponding to a specific time to be accessed. This information may be preserved in the private buffer cache 135 in order to allow read-consistent access to an instance of the inline LOB column.

In some embodiments, the table scan module 132 may determine (step 515) that there are inline LOB columns included in the table that are being accessed by reference based on a flag indicating that the columns were marked as having a reference-based return type in the execution plan 114 (e.g., access to the LOB columns was marked as "LOB by reference"). In other embodiments, the table scan module 132 may determine (step 515) if there are inline LOB columns included in the table that are being accessed by reference based on the absence of a flag. For example, the table scan module 132 may determine (step 515), by default, that the row source tree 116 indicates that there are inline LOB columns included in the table that are being accessed by reference if access to any inline LOB columns was not marked as "LOB by value."

Referring back to FIG. 5, once the inline LOB column has been copied (step 530) to the private buffer cache 135, the evaluation module 136 may then evaluate (step 535) an operator using the data copied (step 530) to the private buffer cache 135 and then generate (step 540) a LOB locator using the data copied to the private buffer cache 135. Continuing with the above example with regard to FIGS. 7A-7B, as shown in FIG. 7C, the evaluation module 136 may evaluate (step 535) the operator using the data in the resume column that was copied (step 530) to the private buffer cache 135 and also generate (step 540) a LOB locator using the same data.

Figure 7D:
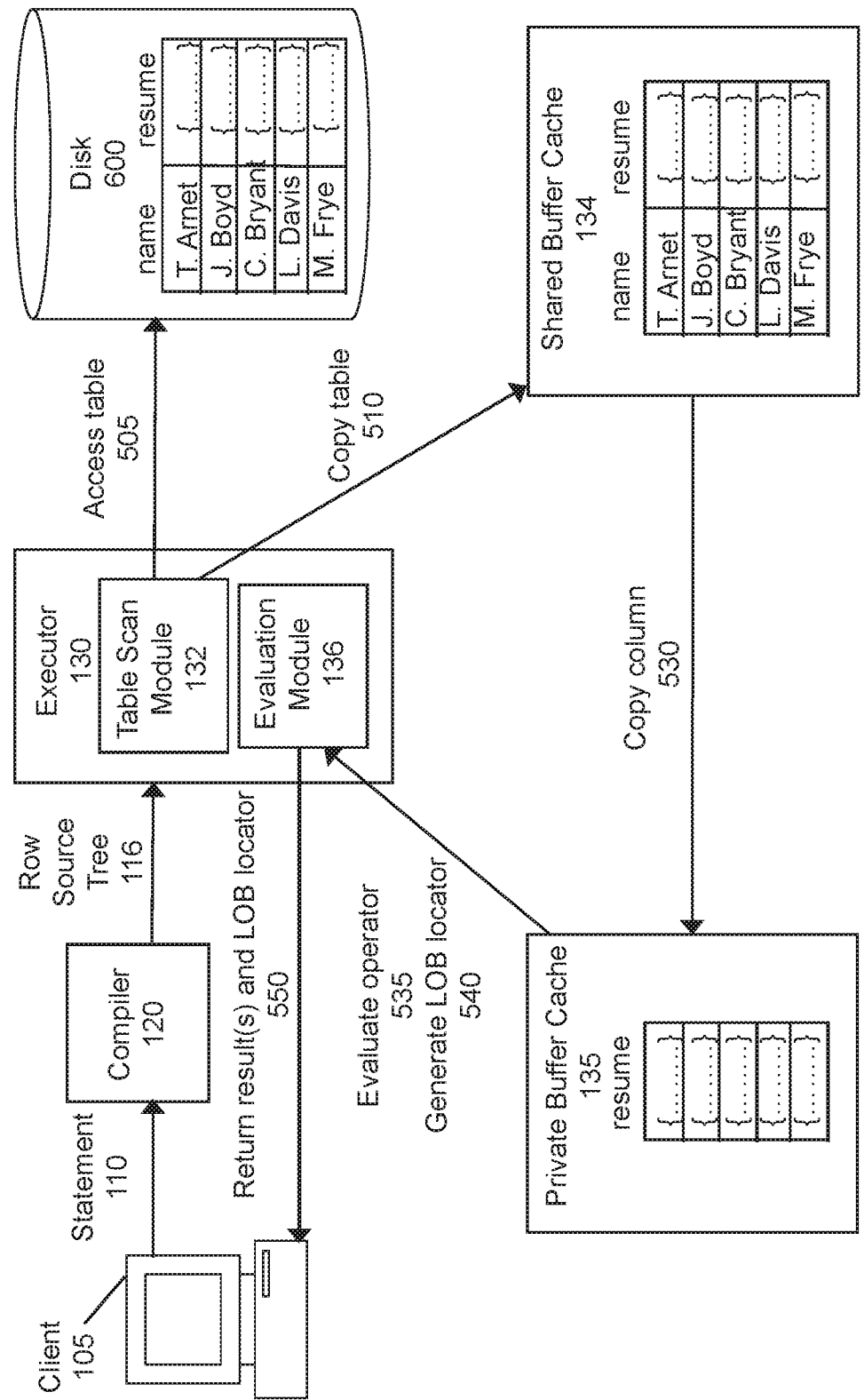

Referring once more to FIG. 5, after the evaluation module 136 has evaluated (step 535) an operator using data in the private buffer cache 135 and generated (step 540) a LOB locator using the same data, the executor 130 may determine (step 545) whether there are any more row sources in the row source tree 116 to process. If so, steps of the execution process may be repeated again at step 505. If not, the executor 130 may return (step 550) a set of results and a set of LOB locators to the client 105. For example, as shown in the example of FIG. 7D, which continues the example discussed above with regard to FIGS. 7A-7C, since a LOB locator was generated (step 540) for the inline LOB column, the LOB locator is returned (step 550) to the client 105 in conjunction with one or more results.

System Architecture

FIG. 8 is a block diagram of an illustrative computing system 800 suitable for implementing an embodiment of the present invention. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to some embodiments of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 810 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. A database 832 in a storage medium 831 may be used to store data accessible by the system 800.

The techniques described may be implemented using various processing systems, such as clustered computing systems, distributed systems, and cloud computing systems. In some embodiments, some or all of the relational database management system described above may be part of a cloud computing system. Cloud computing systems may implement cloud computing services, including cloud communication, cloud storage, and cloud processing.

Figure 9:
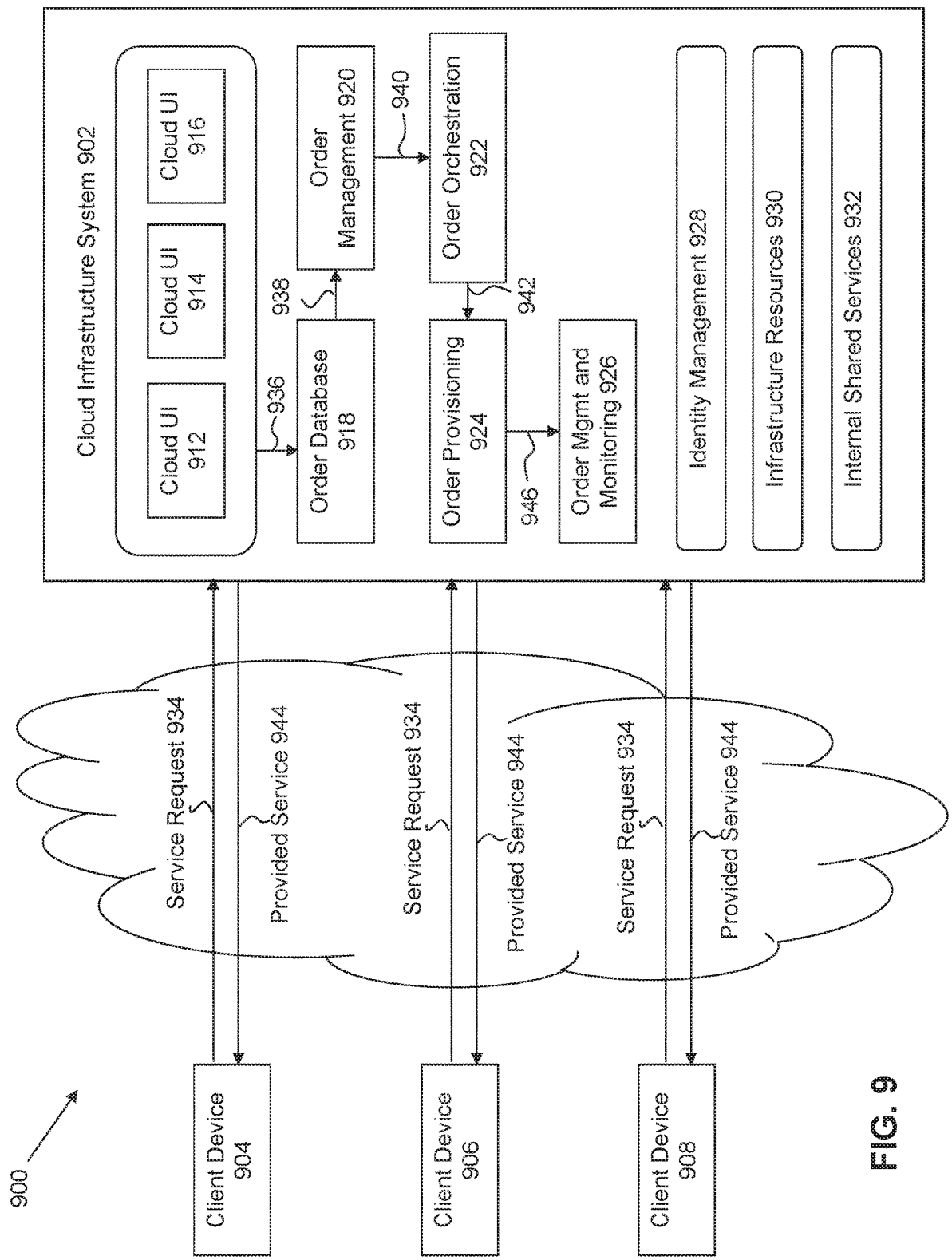
FIG. 9 is a block diagram of one or more components of a system environment by which services provided by one or more components of an embodiment system may be offered as cloud services, in accordance with an embodiment of the present disclosure.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application, or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for FIG. 6. Although system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols. Cloud infrastructure system 902 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916. At operation 936, the order is stored in order database 918. Order database 918 can be one of several databases operated by cloud infrastructure system 918 and operated in conjunction with other system elements. At operation 938, the order information is forwarded to an order management module 920. In some instances, order management module 920 may be configured to perform billing and accounting functions related to the order, such as verifying the order, and upon verification, booking the order. At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 902 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 902 may include an identity management module 928. Identity management module 928 may be configured to provide identity services, such as access management and authorization services in cloud infrastructure system 902. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for identifying locator-less LOB (Large Object) by value semantics included in a statement directed to data stored as an inline LOB in a relational database, the method comprising:
    receiving a statement directed to a table stored in the relational database, the statement comprising an expression that has a value-based return type;
    parsing at least a portion of the statement into a query tree comprising a plurality of branches, a branch of the plurality of branches of the query tree corresponding to a clause of the statement;
    for one or more branches of the query tree, identifying an inline LOB column referenced by the statement;
    determining whether the inline LOB column is included in the expression based at least in part on a set of semantics of the expression;
    generating an execution plan to execute the statement, the execution plan comprising an indication as to whether the inline LOB column is included in the expression that has the value-based return type; and
    executing the statement based at least in part on the execution plan, wherein
        a LOB locator is not generated when the inline LOB column is included in the expression that has the value-based return type, and
        the LOB locator is generated when the inline LOB column is referenced by the statement but is not included in the expression that has the value-based return type.

2. The method of claim 1, wherein executing the statement based at least in part on the execution plan comprising the indication as to whether the inline LOB column is included in the expression having the value-based return type comprises:
    accessing the table stored in the relational database;
    copying the table to a shared buffer cache; and
    determining whether the indication indicates that the inline LOB column is included in the expression having the value-based return type.

3. The method of claim 2, wherein executing the statement based at least in part on the execution plan comprising the indication as to whether the inline LOB column is included in the expression having the value-based return type comprises:
    responsive to determining the indication indicates that the inline LOB column is included in the expression having the value-based return type, setting up access to the inline LOB column in the shared buffer cache; and evaluating an operator using a content of the inline LOB column in the shared buffer cache.

4. The method of claim 2, wherein executing the statement based at least in part on the execution plan comprising the indication as to whether the inline LOB column is included in the expression having the value-based return type comprises:

responsive to determining the indication does not indicate that the inline LOB column is included in the expression having the value-based return type, generating a temporary staging buffer area that is specific to a client;

copying the table and information required to locate a row at which a content of the inline LOB column is stored from the shared buffer cache to the temporary staging buffer area;

evaluating an operator using the content of the inline LOB column in the temporary staging buffer area; and generating a LOB locator based at least in part on the inline LOB column in the temporary staging buffer area.

5. The method of claim 4, further comprising:

copying query snapshot information from the shared buffer cache to the temporary staging buffer area.

6. The method of claim 4, further comprising:

returning the LOB locator to the client.

7. The method of claim 1, wherein determining whether the inline LOB column is included in an expression having a value-based return type based at least in part on a set of semantics of the expression comprises:

determining that the inline LOB column is not included in an expression having a value-based return type if the inline LOB column is included at a top of a select list.

8. The method of claim 1, wherein determining whether the inline LOB column is included in an expression having a value-based return type based at least in part on a set of semantics of the expression comprises:

determining that the inline LOB column is not included in an expression having a value-based return type if the expression includes a function that maps a result of LOB data evaluation into one or more relational rows or columns.

9. The method of claim 1, wherein determining whether the inline LOB column is included in an expression having a value-based return type is further based at least in part on a return type rule correlating the expression with a return type for the expression based at least in part on the set of semantics of the expression.

10. The method of claim 9, wherein the return type rule correlates the expression with a reference-based return type if the expression includes one or more PL/SQL elements.

11. The method of claim 1, further comprising:

generating a row source tree based at least in part on the execution plan, the row source tree comprising a plurality of row sources and a flag corresponding to the indication as to whether the inline LOB column is included in the expression having the value-based return type.

12. The method of claim 11, wherein executing the statement based at least in part on the execution plan comprising the indication as to whether the inline LOB column is included in the expression having the value-based return type comprises:

executing the plurality of row sources comprising the row source tree.

13. The method of claim 1, wherein the indication as to whether the inline LOB column is included in the expression having the value-based return type indicates that the inline LOB column is included in the expression having the value-based return type if the indication does not indicate that the inline LOB column is included in the expression having a reference-based return type.

14. The method of claim 1, wherein the indication as to whether the inline LOB column is included in the expression having the value-based return type indicates that the inline LOB column is not included in the expression having the value-based return type if the indication does not indicate that the inline LOB column is included in the expression having the value-based return type.

15. A computer program product embodied on a non-transitory computer readable medium, the computer readable medium having stored thereon a sequence of instructions which, when executed by a processor causes the processor to execute a method for identifying locator-less LOB (Large Object) by value semantics included in a statement directed to data stored as an inline LOB in a relational database, the method comprising:

receiving a statement directed to a table stored in the relational database, the statement comprising an expression that has a value-based return type;

parsing at least a portion of the statement into a query tree comprising a plurality of branches, a branch of the plurality of branches of the query tree corresponding to a clause of the statement;

for one or more branches of the query tree, identifying an inline LOB column referenced by the statement;

determining whether the inline LOB column is included in the expression based at least in part on a set of semantics of the expression;

generating an execution plan to execute the statement, the execution plan comprising an indication as to whether the inline LOB column is included in the expression that has the value-based return type; and executing the statement based at least in part on the execution plan, wherein a LOB locator is not generated when the inline LOB column is included in the expression that has the value-based return type, and the LOB locator is generated when the inline LOB column is not included in the expression that has the value-based return type.

16. The computer program product of claim 15, wherein executing the statement based at least in part on the execution plan comprising the indication as to whether the inline LOB column is included in the expression having the value-based return type comprises:

accessing the table stored in the relational database;

copying the table to a shared buffer cache; and determining whether the indication indicates that the inline LOB column is included in the expression having the value-based return type.

17. The computer program product of claim 16, wherein executing the statement based at least in part on the execution plan comprising the indication as to whether the inline LOB column is included in the expression having the value-based return type comprises:

responsive to determining the indication indicates that the inline LOB column is included in the expression having the value-based return type, setting up access to the inline LOB column in the shared buffer cache; and evaluating an operator using a content of the inline LOB column in the shared buffer cache.

18. The computer program product of claim 16, wherein executing the statement based at least in part on the execution plan comprising the indication as to whether the inline LOB column is included in the expression having the value-based return type comprises:
  responsive to determining the indication does not indicate that the inline LOB column is included in the expression having the value-based return type, generating a temporary staging buffer area that is specific to a client;
  copying the table and information required to locate a row at which a content of the inline LOB column is stored from the shared buffer cache to the temporary staging buffer area;
  evaluating an operator using the content of the inline LOB column in the temporary staging buffer area; and
  generating a LOB locator based at least in part on the inline LOB column in the temporary staging buffer area.

19. The computer program product of claim 18, wherein the sequence of instructions, when executed by the processor, further executes the step of:
  copying query snapshot information from the shared buffer cache to the temporary staging buffer area.

20. The computer program product of claim 18, wherein the sequence of instructions, when executed by the processor, further executes the step of:
  returning the LOB locator to the client.

21. The computer program product of claim 15, wherein determining whether the inline LOB column is included in an expression having a value-based return type based at least in part on a set of semantics of the expression comprises:
  determining that the inline LOB column is not included in an expression having a value-based return type if the inline LOB column is included at a top of a select list.

22. The computer program product of claim 15, wherein determining whether the inline LOB column is included in an expression having a value-based return type based at least in part on a set of semantics of the expression comprises:
  determining that the inline LOB column is not included in an expression having a value-based return type if the expression includes a function that maps a result of LOB data evaluation into one or more relational rows or columns.

23. The computer program product of claim 15, wherein determining whether the inline LOB column is included in an expression having a value-based return type is further based at least in part on a return type rule correlating the expression with a return type for the expression based at least in part on the set of semantics of the expression.

24. The computer program product of claim 23, wherein the return type rule correlates the expression with a reference-based return type if the expression includes one or more PL/SQL elements.

25. The computer program product of claim 15, wherein the sequence of instructions, when executed by the processor, further executes the step of:
  generating a row source tree based at least in part on the execution plan, the row source tree comprising a plurality of row sources and a flag corresponding to the indication as to whether the inline LOB column is included in the expression having the value-based return type.

26. The computer program product of claim 25, wherein executing the statement based at least in part on the execution plan comprising the indication as to whether the inline LOB column is included in the expression having the value-based return type comprises:
  executing the plurality of row sources comprising the row source tree.

27. The computer program product of claim 15, wherein the indication as to whether the inline LOB column is included in the expression having the value-based return type indicates that the inline LOB column is included in the expression having the value-based return type if the indication does not indicate that the inline LOB column is included in the expression having a reference-based return type.

28. The computer program product of claim 15, wherein the indication as to whether the inline LOB column is included in the expression having the value-based return type indicates that the inline LOB column is not included in the expression having the value-based return type if the indication does not indicate that the inline LOB column is included in the expression having the value-based return type.

29. A computer system to implement a method for identifying locator-less LOB (Large Object) by value semantics included in a statement directed to data stored as an inline LOB in a relational database, the system comprising:
  a processor;
  a memory for holding programmable code; and
  wherein the programmable code includes instructions which, when executed by the processor, cause the processor to perform a set of acts, the set of acts comprising:
  receiving a statement directed to a table stored in the relational database, the statement comprising an expression that has a value-based return type;
  parsing at least a portion of the statement into a query tree comprising a plurality of branches, a branch of the plurality of branches of the query tree corresponding to a clause of the statement;
  for one or more branches of the query tree, identifying an inline LOB column referenced by the statement;
  determining whether the inline LOB column is included in the expression based at least in part on a set of semantics of the expression;
  generating an execution plan to execute the statement, the execution plan comprising an indication as to whether the inline LOB column is included in the expression that has the value-based return type; and
  executing the statement based at least in part on the execution plan, wherein
    a LOB locator is not generated when the inline LOB column is included in the expression that has the value-based return type, and
    the LOB locator is generated when the inline LOB column is not included in the expression that has the value-based return type.

30. The computer system of claim 29, wherein executing the statement based at least in part on the execution plan comprising the indication as to whether the inline LOB column is included in the expression having the value-based return type comprises:
  accessing the table stored in the relational database;
  copying the table to a shared buffer cache; and
  determining whether the indication indicates that the inline LOB column is included in the expression having the value-based return type.

31. The computer system of claim 30, wherein executing the statement based at least in part on the execution plan comprising the indication as to whether the inline LOB column is included in the expression having the value-based return type comprises:

responsive to determining the indication indicates that the inline LOB column is included in the expression having the value-based return type, setting up access to the inline LOB column in the shared buffer cache; and evaluating an operator using a content of the inline LOB column in the shared buffer cache.

32. The computer system of claim 30, wherein executing the statement based at least in part on the execution plan comprising the indication as to whether the inline LOB column is included in the expression having the value-based return type comprises:

responsive to determining the indication does not indicate that the inline LOB column is included in the expression having the value-based return type, generating a temporary staging buffer area that is specific to a client;

copying the table and information required to locate a row at which a content of the inline LOB column is stored from the shared buffer cache to the temporary staging buffer area;

evaluating an operator using the content of the inline LOB column in the temporary staging buffer area; and generating a LOB locator based at least in part on the inline LOB column in the temporary staging buffer area.

33. The computer system of claim 32, wherein the programmable code further includes instructions for:

copying query snapshot information from the shared buffer cache to the temporary staging buffer area.

34. The computer system of claim 32, wherein the programmable code further includes instructions for:

returning the LOB locator to the client.

35. The computer system of claim 29, wherein determining whether the inline LOB column is included in an expression having a value-based return type based at least in part on a set of semantics of the expression comprises:

determining that the inline LOB column is not included in an expression having a value-based return type if the inline LOB column is included at a top of a select list.

36. The computer system of claim 29, wherein determining whether the inline LOB column is included in an expression having a value-based return type based at least in part on a set of semantics of the expression comprises:

determining that the inline LOB column is not included in an expression having a value-based return type if the expression includes a function that maps a result of LOB data evaluation into one or more relational rows or columns.

37. The computer system of claim 29, wherein determining whether the inline LOB column is included in an expression having a value-based return type is further based at least in part on a return type rule correlating the expression with a return type for the expression based at least in part on the set of semantics of the expression.

38. The computer system of claim 37, wherein the return type rule correlates the expression with a reference-based return type if the expression includes one or more PL/SQL elements.

39. The computer system of claim 29, wherein the programmable code further includes instructions for:

generating a row source tree based at least in part on the execution plan, the row source tree comprising a plurality of row sources and a flag corresponding to the indication as to whether the inline LOB column is included in the expression having the value-based return type.

40. The computer system of claim 39, wherein executing the statement based at least in part on the execution plan comprising the indication as to whether the inline LOB column is included in the expression having the value-based return type comprises:

executing the plurality of row sources comprising the row source tree.

41. The computer system of claim 29, wherein the indication as to whether the inline LOB column is included in the expression having the value-based return type indicates that the inline LOB column is included in the expression having the value-based return type if the indication does not indicate that the inline LOB column is included in the expression having a reference-based return type.

42. The computer system of claim 29, wherein the indication as to whether the inline LOB column is included in the expression having the value-based return type indicates that the inline LOB column is not included in the expression having the value-based return type if the indication does not indicate that the inline LOB column is included in the expression having the value-based return type.

* * * * *

UNITED STATES PATENT AND TRADEMARK OFFICE
CERTIFICATE OF CORRECTION

PATENT NO. : 10,942,924 B2  
APPLICATION NO. : 15/807336  
DATED : March 9, 2021  
INVENTOR(S) : Liu et al.

Page 1 of 1

It is certified that error appears in the above-identified patent and that said Letters Patent is hereby corrected as shown below:

In the Specification

In Column 6, Line 31, after "=1600);"" insert -- . --.

In Column 9, Line 30, delete ""j son exists"" and insert -- "json_exists" --, therefor.

In Column 10, Line 37, delete ""j son exists")," and insert -- "json_exists"), --, therefor.

In Column 11, Line 44, before "The" insert -- . --.

In Column 11, Line 52, delete ""% software %';"" and insert -- '%software%';". --, therefor.

In Column 12, Line 1, delete ""% software %';"" and insert -- '%software%';". --, therefor.

In Column 12, Line 23, before "Here," insert -- . --.

In Column 13, Line 23, delete ""% software %';")," and insert -- '%software%';"), --, therefor.

In Column 15, Line 25, after "test;"" insert -- . --.

In Column 17, Line 42, delete ""% software %')" and insert -- '%software%') --, therefor.

In Column 19, Line 37, delete "PTSN," and insert -- PSTN, --, therefor.

In Column 22, Line 7, delete "cloudservices" and insert -- cloud services --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*